United States Patent
Mori et al.

(10) Patent No.: US 7,024,390 B1
(45) Date of Patent: Apr. 4, 2006

(54) ELECTRONIC WALLET MANAGEMENT SYSTEM, ELECTRONIC WALLET DEVICE, ELECTRONIC WALLET MANAGEMENT UNIT, AND TERMINAL STATION

(75) Inventors: Nobuyuki Mori, Kawasaki (JP); Michihiro Miyasaka, Kawasaki (JP); Takayuki Yamaguchi, Tokyo (JP)

(73) Assignees: Fujitsu Limited, Kawasaki (JP); Sumitomo Mitsui Banking Corporation, Tokyo (JP)

( * ) Notice: Subject to any disclaimer, the term of this patent is extended or adjusted under 35 U.S.C. 154(b) by 1277 days.

(21) Appl. No.: 09/657,355

(22) Filed: Sep. 7, 2000

Related U.S. Application Data

(63) Continuation of application No. PCT/JP99/00281, filed on Jan. 22, 1999.

(30) Foreign Application Priority Data

Mar. 13, 1998 (JP) .................................. 10-062742

(51) Int. Cl.
*G06F 17/60* (2006.01)

(52) U.S. Cl. .......................... 705/41; 705/65; 235/379; 235/380

(58) Field of Classification Search ................. 703/41; 235/379, 380
See application file for complete search history.

(56) References Cited

U.S. PATENT DOCUMENTS

| | | | |
|---|---|---|---|
| 5,162,638 A | | 11/1992 | Diehl et al. |
| 5,163,148 A | * | 11/1992 | Walls .......................... 707/204 |
| 5,408,633 A | * | 4/1995 | Katsumura et al. ......... 711/115 |
| 5,440,108 A | * | 8/1995 | Tran et al. ................... 235/381 |
| 5,671,350 A | * | 9/1997 | Wood .......................... 714/15 |
| 5,758,359 A | * | 5/1998 | Saxon ......................... 707/204 |
| 5,892,900 A | * | 4/1999 | Ginter et al. ................ 713/200 |
| 5,902,981 A | * | 5/1999 | Dethloff ...................... 235/375 |
| 5,932,859 A | * | 8/1999 | Ijichi et al. .................. 235/380 |
| 6,397,307 B1 | * | 5/2002 | Ohran ......................... 711/161 |

FOREIGN PATENT DOCUMENTS

| | | |
|---|---|---|
| EP | 0 224 147 A2 | 6/1987 |
| EP | 0 337 794 A2 | 10/1989 |
| EP | 0 437 616 A1 | 7/1991 |
| EP | 0 671 712 A1 | 9/1995 |
| EP | 0 757 337 A2 | 2/1997 |
| EP | 1077425 * | 2/2001 |
| FR | 2 589 268 | 4/1987 |
| JP | 62067673 A | 3/1987 |
| JP | 62-243097 | 10/1987 |
| JP | 02108156 A | 4/1990 |

(Continued)

*Primary Examiner*—Vincent Millin
*Assistant Examiner*—Daniel Felten
(74) *Attorney, Agent, or Firm*—Staas & Halsey LLP

(57) ABSTRACT

The invention solves the inconvenience that a customer would experience when his/her electronic wallet was lost or broken down. A backup condition testing means tests predefined backup conditions to determine whether to make a backup, when an electronic wallet device communicates with any other device to transfer monetary data. When the backup condition testing means has determined to make a backup, a backup data sending means sends a predetermined set of backup data collected from the electronic wallet device. A backup data management means receives the backup data from the backup data sending means and saves the received data into its backup database. In this way, the proposed system automatically saves backup data of the electronic wallet device when any backup condition is met. This mechanism permits the customer to have an alternative electronic wallet device to be promptly issued when his/her electronic wallet device is lost.

10 Claims, 25 Drawing Sheets

FOREIGN PATENT DOCUMENTS

| | | |
|---|---|---|
| JP | 02141871 A | 5/1990 |
| JP | 04085670 A | 3/1992 |
| JP | 04088555 A | 3/1992 |
| JP | 04253235 A | 9/1992 |
| JP | 04367977 A | 12/1992 |
| JP | 06139432 A | 5/1994 |
| JP | 06-162059 | 6/1994 |
| JP | 06176252 A | 6/1994 |
| JP | 09185658 A | 7/1997 |
| JP | 9270052 A | 10/1997 |
| JP | 09330261 A | 12/1997 |
| WO | WO 94/16415 | 7/1994 |
| WO | WO96/17316 | 6/1996 |

\* cited by examiner

| | COMMON CONTROL SEGMENT | |
|---|---|---|
| ELECTRONIC WALLET MANAGEMENT DATA SEGMENT | ELECTRONIC WALLET ID (ISSUANCE NO.) | |
| | DATE OF ISSUE | VALID PERIOD |
| | ISSUER NAME | ISSUER CODE |
| | PASSWORD | TYPE OF ELECTRONIC |
| | DATE AND TIME OF LAST TRANSACTION | LAST TRANSACTION LOG |
| USER MANAGEMENT DATA SEGMENT | PRIVATE DATA | |
| | USER AUTHENTICATION DATA | |
| | NETWORK MANAGEMENT DATA | |
| BACKUP DATA SEGMENT | BACKUP CONDITION DATA | |
| | BACKUP HISTORY DATA | |
| REISSUE DATA SEGMENT | REISSUANCE COUNT | DATE OF LAST REISSUE |
| | DATE OF LAST LOSS | DATE OF FIRST REISSUE |
| | PLACE OF LOSS | PLACE OF REISSUE (ATM) |
| TRANSACTION MANAGEMENT DATA SEGMENT | TRANSACTION MANAGEMENT SUB-SEGMENT | |
| | AUTHENTICATION CENTER DATA | |
| | TRANSACTION MANAGEMENT CENTER DATA | |
| | FINANCIAL INSTITUTION DATA | |
| | CREDIT COMPANY DATA | |
| | HOUSE CARD COMPANY DATA | |
| MONEY MANAGEMENT DATA SEGMENT | MONEY CONTROL SUB-SEGMENT | |
| | MONEY MANAGEMENT SUB-SEGMENT | |
| CHECK/BILL MANAGEMENT DATA SEGMENT | CHECK/BILL CONTROL SUB-SEGMENT | |
| | OWNER'S CHECK MANAGEMENT SUB-SEGMENT | |
| | RECEIVED CHECK MANAGEMENT SUB-SEGMENT | |

FIG. 3

| LAST TRANSACTION LOG | DATE AND TIME OF LAST TRANSACTION | TRANSACTION STATUS WORD |
|---|---|---|
| | TRANSACTION COUNTER | TRANSACTION TYPE |
| | TRANSACTION INTERFACE | AMOUNT OF TRANSACTION |

FIG. 4

| BACKUP CONDI-TION DATA | BACKUP TYPE | BACKUP INTERVAL PARAMETERS | NUMBER OF TRANSFERS | |
|---|---|---|---|---|
| | DESTINATION PROFILE | | TIME INTERVAL | MONTH |
| | SOURCE PROFILE | | | WEEK |
| | PAID AMOUNT DATA | | | DAY |
| | RECEIVED AMOUNT DATA | | | HOUR |
| | BACKUP TARGET SETUP STATUS WORD | | | |
| BACKUP HISTORY DATA | LAST BACKUP MANAGE-MENT DATA | DATE AND TIME OF LAST BACKUP | PREVIOUS BACKUP MANAGE-MENT DATA | DATE AND TIME OF PREVIOUS BACKUP |
| | | TRANSACTION COUNTER AT LAST BACKUP | | TRANSACTION COUNTER AT PREVIOUS BACKUP |
| | | INTERFACE USED IN LAST BACKUP | | INTERFACE USED IN PREVIOUS BACKUP |
| | | PLACE OF LAST BACKUP | | PLACE OF PREVIOUS BACKUP |
| | | LAST BACKUP TRANSACTION STATUS WORD | | PREVIOUS BACKUP TRANSACTION STATUS WORD |

FIG. 5

ELECTRONIC WALLET MANAGEMENT SYSTEM, ELECTRONIC WALLET DEVICE, ELECTRONIC WALLET MANAGEMENT UNIT, AND TERMINAL STATION

This is a Continuation of Application No. PCT/JP99/00281, filed Jan. 22, 1999.

BACKGROUND OF THE INVENTION

1) Field of the Invention

The present invention relates to an electronic wallet management system which controls electronic wallet devices for monetary data transfer, an electronic wallet device itself, an electronic wallet management unit, a terminal station therefor, as well as to a storage medium containing an electronic wallet managing program. More particularly, the present invention relates to an electronic wallet management system which deals with the loss or failure of electronic wallet devices, as well as to an electronic wallet device, an electronic wallet management unit, and a terminal station designed therefor. The present invention also relates to a storage medium containing an electronic wallet managing program for realizing the system.

2) Description of the Related Art

Electronic wallet devices carry electronic money. People use them to make payment electronically, without using real money. Electronic wallet provides various advantages over cash, one of which is that payment can be made more promptly because there is no need to give or receive the change.

People may, however, lose their electronic wallet devices at times. The loss of electronic wallet devices may be handled variously, depending on their device type. For example, in the case of prepaid type devices, which can be used without user authentication, there is no way for the loser to have his/her electronic wallet reissued. This means that the loser would not be able to recover the electronic money at all, unless he/she discovers the very device that is missing. In contrast to this, such electronic wallet devices that require user authentication can be reissued at their respective issuing financial institutions when they are lost. In this case, the monetary data remaining in the lost electronic wallet will eventually be carried over to the reissued device, thus allowing the owner to use it without problems.

Reissuing of such an electronic wallet, however, consumes a long time. Specifically, those that require later settlement, like securities, may take a few months to be reissued. Another such example is banking cards, which manage monetary data not directly, but only through the customers' bank accounts. It takes a couple of weeks for the loser to get such a banking card reissued. What is worse is that the customer cannot spend his/her own money during the time he/she waits for the delivery of a reissued electronic wallet. Those problems in connection with the loss of electronic wallets are also true in another situation where the customer's electronic wallet device is broken down.

SUMMARY OF THE INVENTION

Taking the above into consideration, an object of the present invention to provide an electronic wallet management system which eliminates the inconvenience that one may encounter when his/her electronic wallet is lost or broken down.

It is another object of the present invention to provide an electronic wallet device which minimizes the inconvenience that one may encounter when it is lost or broken down.

It is still another object of the present invention to provide an electronic wallet management unit which minimizes the inconvenience that one may encounter when his/her electronic wallet device is lost or broken down.

It is yet another object of the present invention to provide a terminal station which minimizes the inconvenience that one may encounter when it is lost or broken down.

It is a further object of the present invention to provide a storage medium containing an electronic wallet management program which minimizes the inconvenience that one may encounter when his/her electronic wallet device is lost or broken down.

To accomplish the above objects, according to the present invention, there is provided an electronic wallet management system which manages an electronic wallet devices holding monetary data. This system comprises the following elements: backup condition testing means for testing predefined backup conditions to determine whether to make a backup, when the electronic wallet device communicates with any other device to transfer monetary data; backup data sending means for sending out a predetermined set of backup data collected from the electronic wallet device, when the backup condition testing means has determined to make a backup; and backup data management means for receiving the backup data from the backup data sending means and saving the received backup data into a backup database.

The proposed electronic wallet management system operates as follows. Each time an electronic wallet device is used, the backup condition testing means tests whether any of the predefined backup conditions is met. If any condition is met, the backup data sending means sends a predetermined set of backup data. By the backup data management means, this backup data is saved into a backup database. In this way, the proposed system automatically saves backup information when a relevant backup condition is met, thus making it possible to promptly reissue an alternative electronic wallet device when the customer lost his/her own device.

The present invention also provides an electronic wallet device which transfers monetary data. This electronic wallet device comprises the following elements: backup condition testing means for testing predefined backup conditions to determine whether to make a backup, when the electronic wallet device communicates with any other device to transfer monetary data; and backup data sending means for sending out a predetermined set of backup data collected from the electronic wallet device, when the backup condition testing means has determined to make a backup.

The proposed electronic wallet device operates as follows. Each time a transfer of funds occurs, the backup condition testing means tests whether any of the predefined backup conditions is met. If any condition is met, the backup data sending means sends a predetermined set of backup data. By storing such backup data, an electronic wallet management unit can promptly reissue an alternative electronic wallet device when a customer lost his/her own electronic wallet device.

Further, the present invention provides an electronic wallet management unit which manages an electronic wallet device, comprising temporary electronic wallet data producing means, responsive to an accident report received from a terminal station, for calculating elapsed time between the last backup operation for an issued electronic wallet device and the reception of the accident report, compiling temporary electronic wallet data having a limited valid period and a credit limit that is determined according to the elapsed time, and sending the temporary electronic wallet data back to the terminal station.

The proposed electronic wallet management unit operates as follows. When an accident report is received from a terminal station, the temporary electronic wallet data producing means outputs temporary electronic wallet data having a limited valid period and a credit limit that is determined according to the elapsed time since the last backup operation. A temporary electronic wallet device containing such temporary electronic wallet data can be issued to the customer for the sake of his/her convenience, with a minimum risk at the issuer side.

In addition, the present invention provides a terminal station coupled to an electronic wallet management unit. This terminal station comprises the following elements: medium storage means for storing a plurality of temporary electronic wallet devices in stock for future issuance; receiving means for receiving the accident report concerning an electronic wallet device; transmission means for forwarding the received accident report to the electronic wallet management unit; temporary electronic wallet data writing means for writing the temporary electronic wallet data to a memory of one of the temporary electronic wallet devices stored in the medium storage means, the temporary electronic wallet data being supplied from the electronic wallet management unit in response to the forwarded accident report; and temporary electronic wallet device releasing means for releasing the temporary electronic wallet device containing the temporary electronic wallet data.

The proposed terminal station operates as follows. When an accident report concerning an electronic wallet device arrives at the receiving means, the transmission means forwards it to the electronic wallet management unit. The electronic wallet management unit then supplies temporary electronic wallet data. The temporary electronic wallet data writing means writes this temporary electronic wallet data to a memory of one of the temporary electronic wallet devices stored in the medium storage means. Then the temporary electronic wallet device releasing means releases the temporary electronic wallet device containing the temporary electronic wallet data. In this way, the customer can receive a temporary electronic wallet device by entering an accident report to the station, which eliminates his/her inconvenience for the time being.

Moreover, the present invention provides a computer-readable medium storing an electronic wallet management program which manages an electronic wallet device holding monetary data. This program causes a computer to function as: backup condition testing means for testing predefined backup conditions to determine whether to make a backup, when the electronic wallet device communicates with any other device to transfer monetary data; backup data sending means for sending out a predetermined set of backup data collected from the electronic wallet device, when said backup condition testing means has determined to make a backup; and backup data management means for receiving the backup data from said backup data sending means and saving the received backup data into a backup database.

When the stored electronic wallet management program is executed on a computer, the computer will function as: backup condition testing means for testing predefined backup conditions to determine whether to make a backup, when the electronic wallet device communicates with any other device to transfer monetary data; backup data sending means for sending out a predetermined set of backup data collected from the electronic wallet device, when said backup condition testing means has determined to make a backup; and backup data management means for receiving the backup data from said backup data sending means and saving the received backup data into a backup database.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 3 is a diagram which shows memory data stored in an electronic wallet device;

FIG. 4 is a diagram which shows the details of Last Transaction Log;

FIG. 5 is a diagram which shows the details of Backup Data segment;

DESCRIPTION OF THE PREFERRED EMBODIMENTS

Several embodiments of the present invention will be described below with reference to the accompanying drawings.

Figure 1:
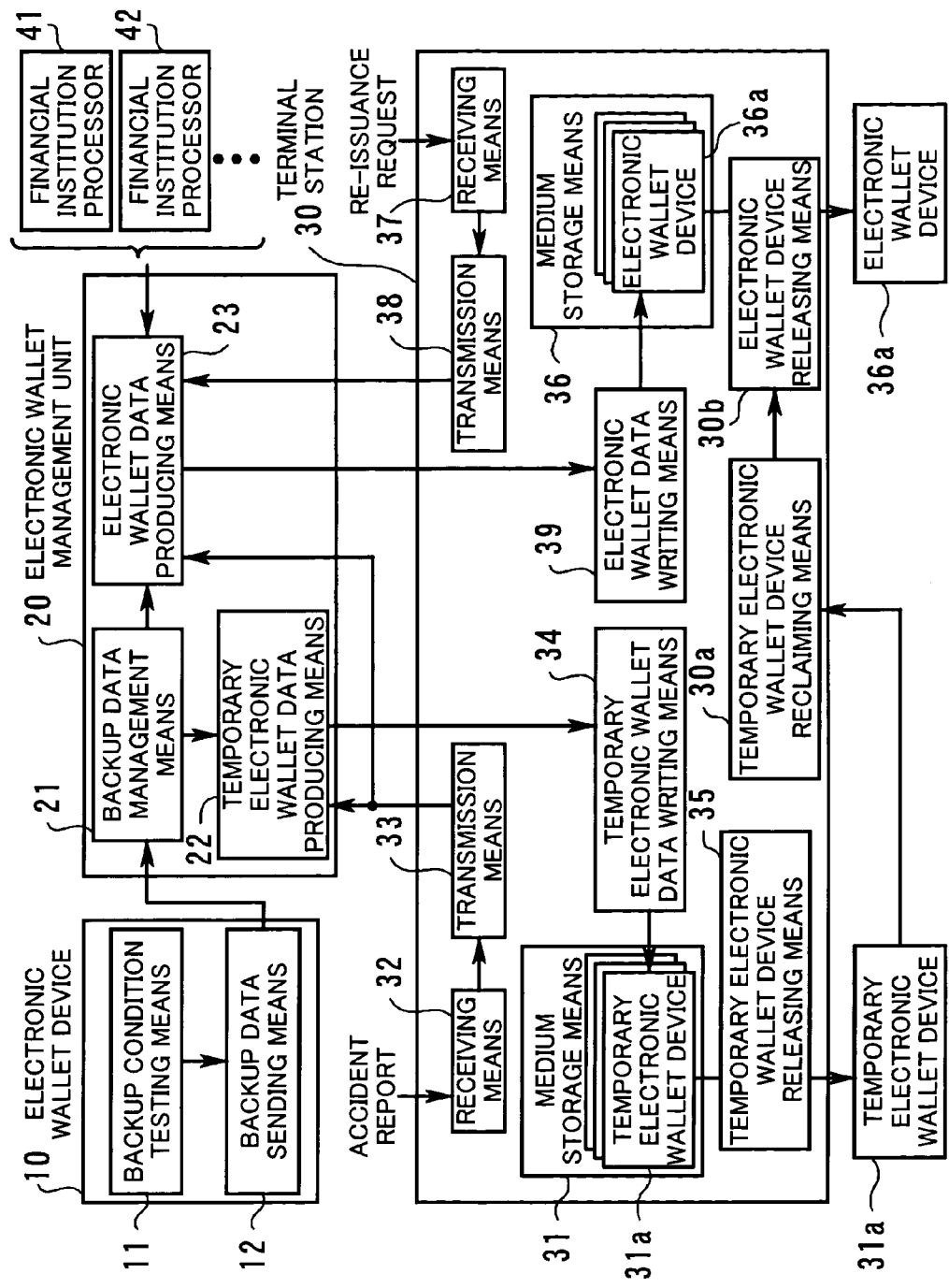
FIG. 1 shows the principle of the present invention.

FIG. 1 shows the principle of the present invention. This proposed electronic wallet management system provides distinctive functions in its electronic wallet device 10, electronic wallet management unit 20, and terminal station 30.

The electronic wallet device 10 comprises a backup condition testing means 11 and a backup data sending means 12. The backup condition testing means 11 tests predefined backup conditions to determine whether to make a backup to save the current state, when the electronic wallet device 10 communicates with any other device to transfer monetary data for payment or reception of funds. The backup data sending means 12 outputs a predetermined set of backup data out of the electronic wallet device 10 when the backup condition testing means 11 has determined to make a backup.

The electronic wallet management unit 20 comprises a backup data management means 21, a temporary electronic wallet data producing means 22, and an electronic wallet data producing means 23. The backup data management means 21 receives the backup data from the backup data sending means 12 and saves the received data into its backup database. The temporary electronic wallet data producing means 22 is responsive to an accident report sent from the terminal station 30 concerning an electronic wallet device that has been issued to a customer. In this event, the temporary electronic wallet data producing means 22 calculates the elapsed time between the last backup operation made for that electronic wallet device and the reception of the accident report. The temporary electronic wallet data producing means 22 compiles temporary electronic wallet data and sends it to the terminal station 30, specifying an appropriate valid period and a credit limit depending on the elapsed time. The electronic wallet data producing means 23 is also responsive to the accident report, which produces electronic wallet data by collecting data required for the reissuance of the electronic wallet device, including the backup data maintained in the backup data management means 21 and other information stored in remote financial institution processors 41 and 42. It transfers the produced data to the terminal station 30 when a reissuance request is received from there.

What has been referred to as the terminal station 30 is actually an automatic teller machine (ATM) of a banking institution, a point-of-sale (POS) terminal, or a personal computer. The processing functions of the terminal station 30 may be divided into the following two groups: those for handling an accident report of an electronic wallet device, and those for reissuing an electronic wallet device. The accident handling functions are provided by a medium storage means 31, a receiving means 32, a transmission means 33, a temporary electronic wallet data writing means 34, and a temporary electronic wallet device releasing means 35. The medium storage means 31 stores a plurality of blank temporary electronic wallet devices 31*a* in stock for future issuance. The receiving means 32 receives an accident report about an electronic wallet device. The transmission means 33 forwards the received accident report to the electronic wallet management unit 20. The temporary electronic wallet data writing means 34 writes temporary electronic wallet data to the memory of a new temporary electronic wallet device 31*a* stored in the medium storage means 31. This temporary electronic wallet data is supplied from the electronic wallet management unit 20 in response to the accident report. The temporary electronic wallet device releasing means 35 releases the temporary electronic wallet device 31*a* containing the temporary electronic wallet data.

The reissuance processing functions, on the other hand, are provided by a medium storage means 36, a receiving means 37, a transmission means 38, an electronic wallet data writing means 39, a temporary electronic wallet device reclaiming means 30*a*, and an electronic wallet device releasing means 30*b*. The medium storage means 36 stocks a plurality of blank electronic wallet devices 36*a* for future issuance. The receiving means 37 receives a reissuance application for an electronic wallet device. The transmission means 38 forwards the received reissuance application to the electronic wallet management unit 20. The electronic wallet data writing means 39 writes electronic wallet data to the memory of a new electronic wallet device 36*a* stored in the medium storage means 36. The electronic wallet data is supplied from the electronic wallet management unit 20 in response to the reissuance application. The temporary electronic wallet device reclaiming means 30*a* traps and collects a temporary electronic wallet device 31*a* when it is inserted to the terminal station 30. The electronic wallet device releasing means 30*b* releases the electronic wallet device 36*a* containing the electronic wallet data, after the temporary electronic wallet device reclaiming means 30*a* has trapped the temporary electronic wallet device 31*a*.

The above-described electronic wallet management system operates as follows. When a customer transfers funds through his/her electronic wallet device 10, the backup condition testing means 11 determines whether to make a backup. If backup is necessary, the backup data sending means 12 sends out backup data. This backup data is received and maintained by the backup data management means 21 in the electronic wallet management unit 20.

When the electronic wallet device 10 is lost or broken down, the customer enters an accident report to the terminal station 30 to notify the system of the loss or failure of his/her electronic wallet device. This accident report is accepted at the receiving means 32 and forwarded to the electronic wallet management unit 20 through the transmission means 33. In the electronic wallet management unit 20, the temporary electronic wallet data producing means 22 produces temporary electronic wallet data on the basis of the backup data of the electronic wallet device 10 in question, which is maintained in the backup data management means 21. The produced data is sent back to the terminal station 30. It is received by the temporary electronic wallet data writing means 34 in the terminal station 30. The temporary electronic wallet data writing means 34 writes the received data into the memory of a temporary electronic wallet device 31*a* which is stocked in the medium storage means 31. After that, the temporary electronic wallet device releasing means 35 releases the temporary electronic wallet device 31*a* containing the temporary electronic wallet data. With this temporary electronic wallet device 31*a*, the customer can enjoy electronic money transactions.

The accident report transmitted by the transmission means 33 would also reach the electronic wallet data producing means. This report causes the electronic wallet data producing means to collect data necessary for compiling electronic wallet data for the purpose of reissuance.

The customer files a reissuance application through the terminal station 30 after a prescribed time has elapsed since the accident report was submitted. This reissuance application is received at the receiving means 37 and forwarded to the electronic wallet management unit 20 through the transmission means 38. In the electronic wallet management unit 20, the electronic wallet data producing means 23 responds to the reissuance application by sending out the electronic wallet data which has already been prepared. This electronic wallet data reaches the electronic wallet data writing means 39, where it is written into the memory of an electronic wallet device 36*a* stocked in the medium storage means 36. The customer then inserts his/her temporary electronic wallet device 31*a* to the terminal station 30. The inserted wallet device 31a is trapped and collected by the temporary electronic wallet device reclaiming means 30a. In exchange for this, the electronic wallet device releasing means 30b releases the electronic wallet device 36a containing the electronic wallet data, and the customer receives the reissued electronic wallet device 36a.

As described above, the proposed system is designed to make a data backup when the customer uses his/her electronic wallet device 10. This automated backup mechanism enables quick reissuance of an electronic wallet device. Further, the proposed system offers a temporary electronic wallet device to meet an immediate demand of the customer, until an official version of electronic wallet device can be issued. This temporary measure will minimize the inconvenience to the customer.

Figure 2:
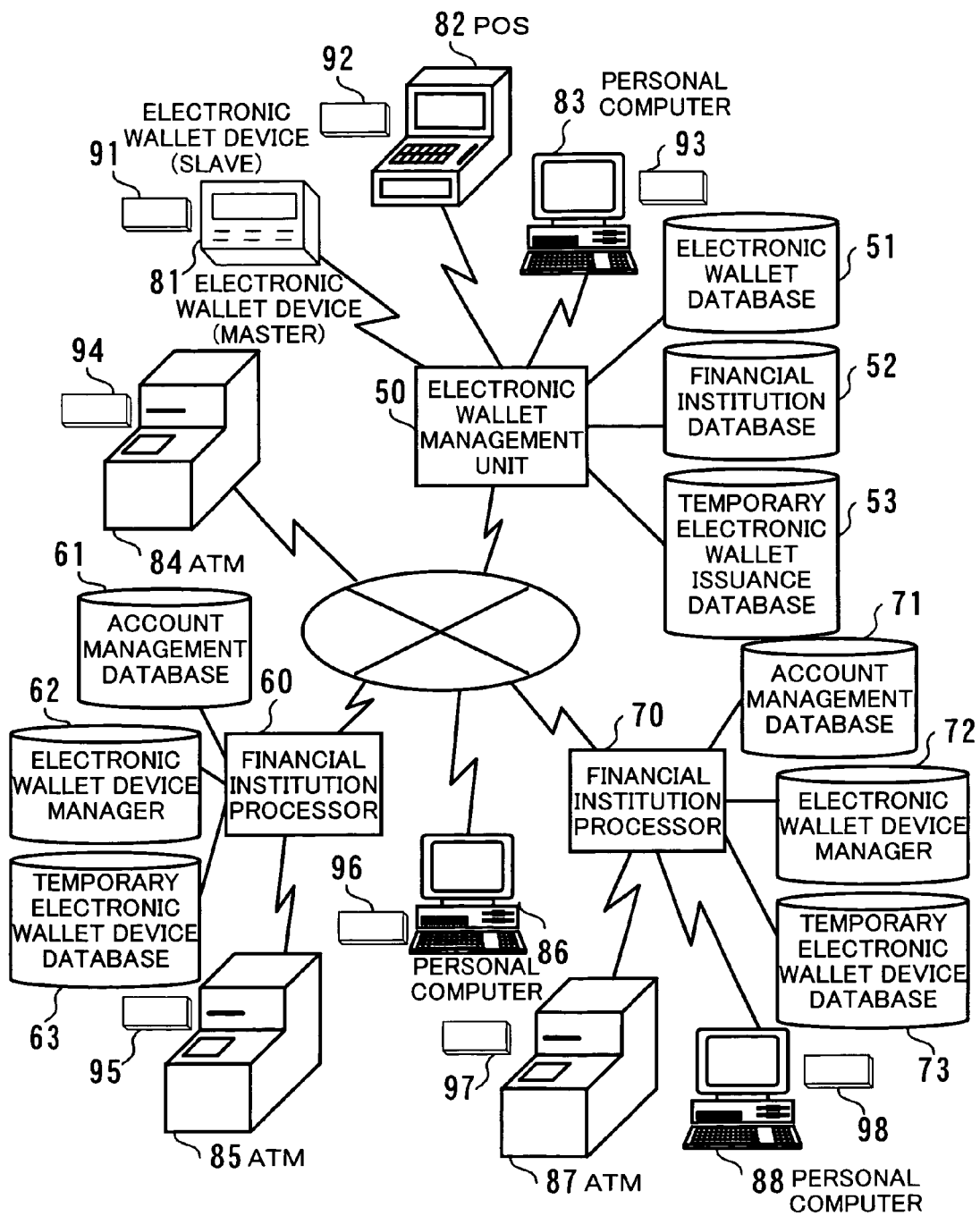
FIG. 2 is a block diagram of a system where the present invention is embodied.

FIG. 2 is a block diagram of a system where the present invention is embodied. The electronic wallet management system of the present invention comprises an electronic wallet management unit 50 and a plurality of financial institution processors 60 and 70, which play a central role in the system. The electronic wallet management unit 50 and the financial institution processors 60 and 70 are interconnected via a network.

The electronic wallet management unit 50 comprises an electronic wallet database 51, a financial institution database 52, and a temporary electronic wallet issuance database 53. The electronic wallet database 51 stores backup data and other information downloaded from electronic wallet devices. The financial institution database 52 stores information about the financial institution processors on the network. The temporary electronic wallet issuance database 53 maintains data about temporary electronic wallet devices that have been issued.

The financial institution processor 60 comprises an account management database 61, an electronic wallet device manager 62, and a temporary electronic wallet device database 63. Likewise, the other financial institution processor 70 comprises an account management database 71, an electronic wallet device manager 72, and a temporary electronic wallet device database 73. The account management databases 61 and 71 store account parameters, such as the amount of each customer's deposit. The electronic wallet device managers 62 and 72 store information about electronic wallet devices issued by the financial institutions that they are serving. The temporary electronic wallet device databases 63 and 73 store information about temporary electronic wallet devices issued by the financial institutions that they are serving.

A master electronic wallet device 81, a point-of-sale (POS) terminal 82, and a personal computer 83 are linked to the electronic wallet management unit 50 via its local network. Automatic teller machines (ATM) 85 and 87 are linked to the financial institution processors 60 and 70, respectively, via their local networks. A personal computer 88 is also linked to the financial institution processor 70. Further, an ATM 84 and a personal computer 86 are connected directly to the network. The above ATMs and personal computers are each equipped with an interface to slave electronic wallet devices 91 to 98, which are implemented in the form of IC cards. Essentially, those slave electronic wallet devices 91 to 98 are computer subsystems each comprising a processor and memory components. The ATMs 84, 85, and 87 keep blank electronic wallet devices in stock, which contain no monetary data in their memory. These blank devices are for future use in issuing a temporary electronic wallet device. When so requested, the ATM 84, 85, and 87 writes appropriate data into a blank device and outputs it as a temporary electronic wallet device.

The above electronic wallet management system is intended for transfer of monetary data with electronic wallet devices. For this purpose, electronic wallet devices have to carry some necessary data as will be described below.

FIG. 3 shows memory data stored in an electronic wallet device.

The "Common Control" segment contains basic control parameters necessary for the electronic wallet device to operate. More specifically, this segment holds memory addresses of various data segments and sub-segments described below.

The "Electronic Wallet Management Data" segment has the following information fields: "Electronic Wallet ID" (Issuance No.), "Date of Issue," "Valid Period," "Issuer Name," "Issuer Code," "Password," "Type of Electronic Wallet," "Date and Time of Last Transaction," and "Last Transaction Log." The Electronic Wallet ID field contains an identification code that is assigned to each electronic wallet device when it is issued. The Date of Issue field indicates when that electronic wallet device was issued. The Issuer Name field shows the name of the establishment that issued the electronic wallet device. The Issuer Code field contains the identification code of the issuer. The Password field contains a special character string that only the owner of the electronic wallet device knows for use in authenticating the user of the electronic wallet device. The Type of Electronic Wallet field indicates the current operation mode and I/O mode being set to the electronic wallet. While electronic wallet systems are designed for electronic cash transactions and settlement account (checks and bills) transactions, each individual electronic wallet device may be restricted to either of those two kinds of transactions, or can handle both kinds of transactions, depending on its current operation mode setup. The I/O mode determines whether to enable input/output functions. The Date and Time of Last Transaction field indicates the date and time of the most recently conducted transaction, including inquiry, and the Last Transaction Log field holds a log record of that transaction. The details of Last Transaction Log will be provided later.

The "User Management Data" segment is divided into the following three sub-segments: "Private Data," "User Authentication Data," and "Network Management Data." More specifically, the Private Data sub-segment contains the owner's private information, including his/her name, sex, and address. The User Authentication Data sub-segment contains digital signature or like information. The Network Management Data sub-segment contains network address information and the owner's identification code.

The "Backup Data" segment is divided into two sub-segments: "Backup Condition Data" and "Backup History Data." The Backup Condition Data sub-segment contains information about on what conditions a data backup process should be invoked. The Backup History Data sub-segment contains history records describing some data backup operations that were conducted in the past. The specifics of these two sub-segments will be provided in a later section.

The "Reissue Data" segment stores the following data fields: "Reissuance Count," "Date of Last Loss Report," "Place of Loss Report," "Date of Last Reissue," Date of First Reissue," and "Place of Reissue (ATM)." The Reissuance Count field is used as a counter that is to be incremented by one each time the electronic wallet is reissued. The Date of Last Loss Report and Place of Loss Report fields indicate when and where the last loss report was submitted, respectively. The Date of Last Reissue field records when the electronic wallet device was reissued last time. The Date of First Reissue field records when was the first time that the electronic wallet device was reissued. The Place of Reissue (ATM) field indicates where (or at which ATM) the reissuance was made last time.

The "Transaction Management Data" segment is divided into the following parts: "Transaction Management" sub-segment, "Authentication Center Data," "Transaction Management Center Data," "Financial Institution Data," "Credit Card Company Data," and "House Card Company Data." The Transaction Management sub-segment contains the memory addresses of various information resources necessary for transaction management. The Authentication Center Data field contains the name and identification code of an authentication center. The Transaction Management Center Data field contains the name and identification code of a transaction management center. The Financial Institution Data field contains the name and identification code of a financial institution. The Credit Company Data field contains the name and identification code of a credit company. The House Card Company Data field contains the name and identification code of a house card company.

The "Money Management Data" segment is used in electronic money transactions, which comprises "Money Control" and "Money Management" sub-segments. The Money Management sub-segment contains information such as the present date and sub-passwords. The Money Management sub-segment shows the current balance of the electronic money account, as well as containing some criteria to be considered in payment transactions (e.g., whether to perform user authentication).

The "Check/Bill Management Data" segment comprises the following sub-segments: "Check/Bill Control," "Owner's Check Management," and "Received Check Management." The Check/Bill Control sub-segment contains the memory addresses of various information resources necessary for managing checks and bills. The Owner's Check Management sub-segment contains the name of a financial institution where the owner has his/her checking account, as well as the credit limit given to the owner. The Received Check Management sub-segment contains information about received checks, including the name of the financial institution that issued each check and the face value of that check.

FIG. 4 shows the details of the Last Transaction Log. This data block maintains records of two kinds of transactions which caused information updates. One is online transactions through an electronic wallet management unit. The other is offline transactions without using an electronic wallet management unit. To say a transaction is "online" is to say the electronic wallet device is coupled to an electronic wallet management unit during that transaction. The term "offline" means the opposite situation. Even when it has a link to other networks or processor, the electronic wallet is said to be offline if there is no connection to a relevant electronic wallet management unit.

The Last Transaction Log contains the following data fields. The "Date and Time of Last Online Transaction" field indicates when the last transaction was made through an electronic wallet management unit. This field is updated each time a transaction is successfully completed, which is signaled as a positive acknowledgment sent from the other party being involved. The recorded date and time is used, together with a predetermined backup interval, to determine when to perform a backup operation. It is also used in transmitting a timestamp as one of the security measures such as data encryption to protect against eavesdropping of messages.

The "Date and Time of Last Offline Transmission" field records when the last offline transaction was made without using an electronic wallet management unit. This field data is updated in response to an acknowledgment indicating that the offline transaction has been successfully completed, as well as being sent to the remote party as part of a transaction log, together with the monetary data being transferred thereto.

As described above, the date and time of the last online transaction is recorded separately from that of the last offline transaction. Because of these two independent fields, the history of both online and offline transactions can be managed more precisely. Further, the data backup function can be triggered at predetermined intervals in the case of online transactions.

The "Transaction Counter" field is divided into two subfields: online transaction counter and offline transaction counter. The online transaction counter is incremented by one each time an online transaction is completed. Likewise, the offline transaction counter is incremented each time an offline transaction is completed. The online transaction counter is used to determine whether to perform a backup operation according to a predetermined backup interval. The online transaction counter is also sent to a relevant electronic wallet management unit as one of the security measures. The electronic wallet management unit compares the value of this counter with its local record relevant to the electronic wallet device of interest, thereby protecting the system against fraudulent messages. The off-line transaction counter is transferred to the remote party as part of a transaction record, along with the monetary data. The transaction counters are reset to zero each time a backup process is executed.

The "Transaction Interface" field is actually divided into two subfields: online transaction interface and offline transaction interface. The online transaction interface refers to what kind of equipment (e.g., personal computer, POS, ATM) was used in the last online transaction. The offline transaction interface, on the other hand, refers to what kind of equipment (e.g., personal computer, POS, electronic wallet device) was used in the last offline transaction. As such, the Transaction Interface field shows the equipment used in the last transaction.

The "Transaction Status Word" field contains a plurality of flag bits corresponding to different transaction types. Each time a transaction is completed, a corresponding flag bit is set to one, or "ON," to record what kind of transaction it was. When a data backup operation is performed, all the flag bits are reset to zeros, or "OFF."

The above mechanism of the Transaction Status Word field makes it possible to identify what kinds of transactions have been conducted since the last backup. This status word is tested at the time of a scheduled regular backup operation to determine what data should be backed up. That is, the system calculates a logical product of the Transaction Status Word and Backup Target Event Status Word (a piece of information in the Backup Condition Data sub-segment), and based on the resultant flag bits, it compiles backup data by extracting necessary data blocks whose corresponding flag bits are being set to "ON."

The "Transaction Type" field records what kind of transaction was made in the last online or offline transaction. More specifically, the record maintains transaction class and transaction mode. The transaction class subfield indicates which instrument was used in the transaction. Electronic money transactions, for example, should be distinguished from credit card transactions. The transaction mode subfield shows what specific processing operation (e.g., bill payment, fund transfer) was performed in the last transaction.

FIG. 5 shows the details of the backup data segment.

The Backup Condition Data segment contains the following data elements:
  Backup Type
  Backup Interval Parameters
  Destination Account Information
  Source Account Information
  Paid Amount Data
  Received Amount Data
  Backup Transaction Status Word The Backup Type specifies when to make a backup of transaction data. More specifically, there are four options as follows. A first option is to make a back up when the system has conducted such a payment transaction whose destination account or payment purpose agrees with a prescribed destination or purpose. A second option is to make a back up every time a predetermined number of transactions are finished ("once every n transactions"). A third option is to make a backup at predetermined intervals ("once every n days/hours"). A fourth option is to make a back when any of the above three occasions is encountered.

The Backup Interval Parameters provide a specific backup interval setup depending on the Backup Type. In the case of "once every n transactions" mode, the number of transactions (or the number of transfers) is set as a parameter. In the case of "once every n days/hours" mode, the interval is designated by a combination of month, week, and day, or defined in units of hour. To enable these two kinds of setups simultaneously, one should define both parameters, i.e., Number of Transfers and Time Interval.

The "Destination Profile" field contains information about the destination account or payment purpose to be referenced as a trigger condition of backup operations. The system will invoke its backup process every time the owner of an electronic wallet device makes a payment to the specified destination account or for the specified payment purpose.

The "Source Profile" field contains information about the source account to be referenced as a trigger condition of backup operations. The system will invoke its backup process every time the wallet owner makes a payment using the specified source account.

The "Paid Amount Data" field is used to set the amount of money which is referenced in payment transactions as a trigger condition of backup operations. The system will invoke its backup process every time the wallet owner makes a payment that exceeds the critical amount specified in this field.

The "Received Amount Data" field is used to set the amount of received money which is referenced as a trigger condition of backup operations. The system will invoke its backup process every time the wallet owner receives funds exceeding the critical amount specified in this field.

The "Backup Target Event Status Word" consists of a plurality of flag bits corresponding to various transaction types. When a specific flag bit is set to one, it means that any updates made to the corresponding transaction are subject to backup. That is, the system will save the data related to such a transaction, if any changes have happened to that data.

Figure 6:
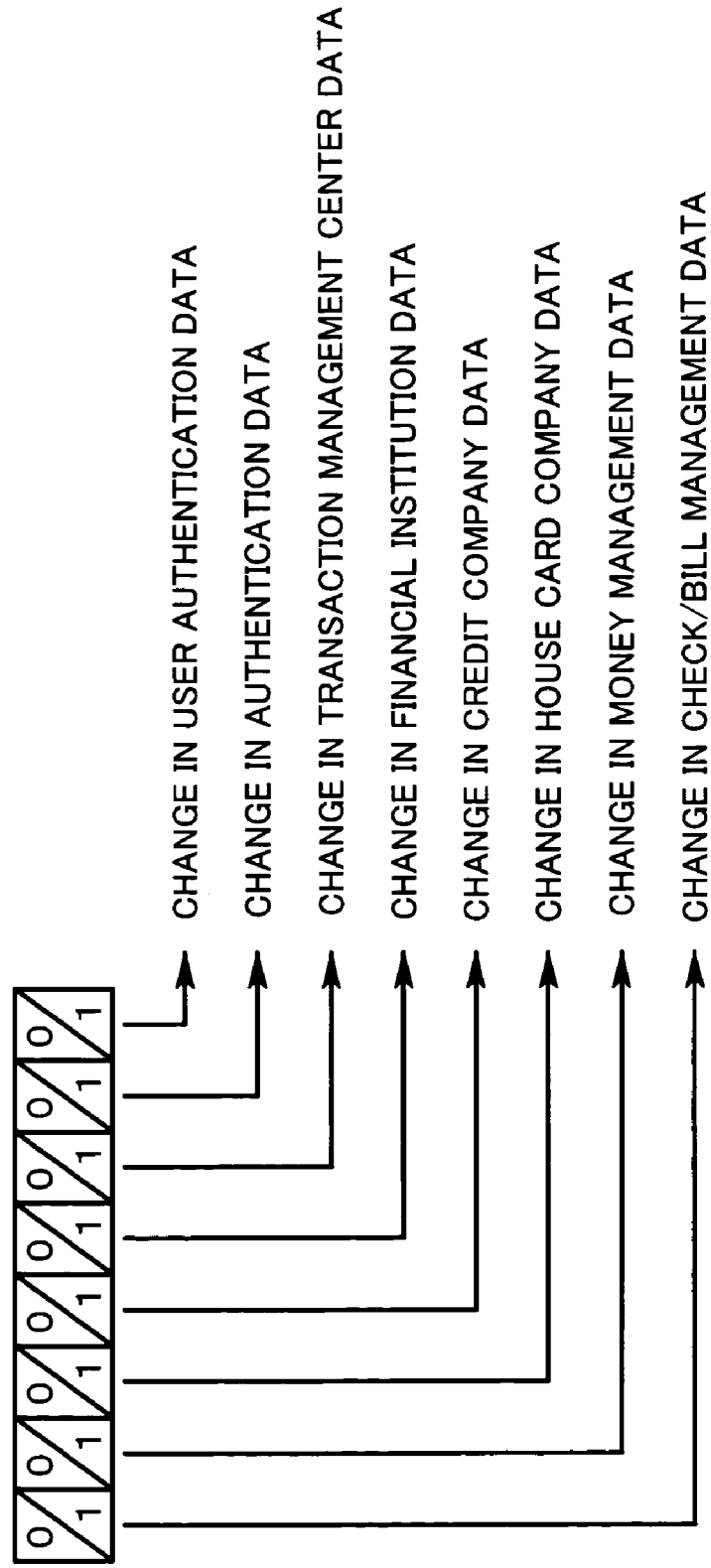
FIG. 6 is a diagram which shows an example of Backup Target Event Status Word.

FIG. 6 shows an example of the Backup Target Event Status Word, which consists of eight flag bits entitled as follows (from the right hand of FIG. 6):

Change in User Authentication Data
  Change in Authentication Center Data
  Change in Transaction Management Center Data
  Change in Financial Institution Data
  Change in Credit Company Data
  Change in House Card Company Data
  Change in Money Management Data
  Change in Check/Bill Management Data When making a backup, the system compiles backup data by collecting relevant data blocks from the data segments whose corresponding flag bits are being set to one.

Referring back to FIG. 5, the Backup History Data sub-segment comprises the following two sections: "Last Backup Management Data" and "Previous Backup Management Data."

The Last Backup Management Data section contains the following data fields:
  Date and Time of Last Backup
  Transaction Counter at Last Backup
  Interface Used at Last Backup
  Place of Last Backup
  Last Backup Transaction Status Word The Date and Time of Last Backup field indicates when the system made a data backup last time. The Transaction Counter at Last Backup field stores the transaction counter value which was sampled from the Last Transaction Log at the time of the last backup operation. The Interface Used in Last Backup field shows which equipment was used in the last backup operation. The Place of Last Backup field indicates where the last backup operation was conducted. The Last Backup Transaction Status Word preserves the backup transaction status word at the time of the last backup operation.

The Previous Backup Management Data section contains the following data fields:
  Date and Time of Previous Backup
  Transaction Counter at Previous Backup
  Interface Used in Previous Backup
  Place of Previous Backup
  Previous Backup Transaction Status Word The Date and Time of Previous Backup field indicates when was the last backup but one. The Transaction Counter at Previous Backup field stores the transaction counter value which was sampled from the Last Transaction Log at the time of the last backup but one. The Interface Used in Previous Backup field shows which equipment was used in the last backup but one. The Place of Previous Backup field indicates where the backup operation was conducted last time but one. The Previous Backup Transaction Status Word preserves the Backup Transaction Status Word at the time of the last backup but one.

Figure 7:
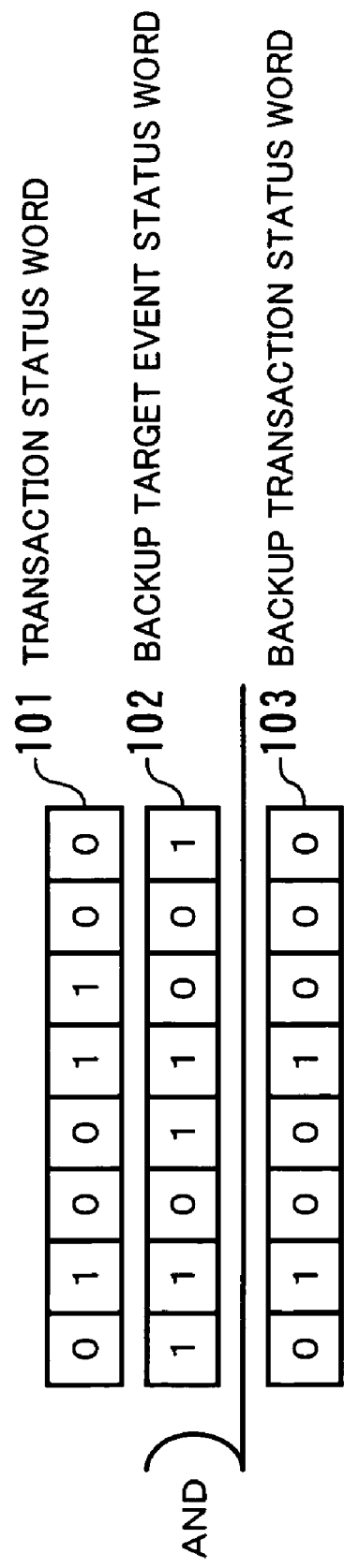
FIG. 7 is a diagram which shows an example of how a backup transaction status word is obtained.

FIG. 7 shows an example of how a backup transaction status word is obtained. When a backup process is invoked, the system calculates a logical product (AND) of the transaction status word 101 at that point in time and the Backup Target Event Status Word 102. If those two status words have any common flag bits being set to ON, then the system will yield the resultant backup transaction status word 103 with the corresponding bits set. That is, a specific data segment will be backed up if it is previously designated as a backup source, and only if that data segment has been updated since the last backup session.

The above mechanism eliminates unnecessary data segments from the list of backup sources. Further, it is possible to quickly collect and compile backup data since the sources can be reached by using indexes.

The electronic wallet management system configured as above is designed to perform various processing operations. The specifics will be explained below.

Figure 8:
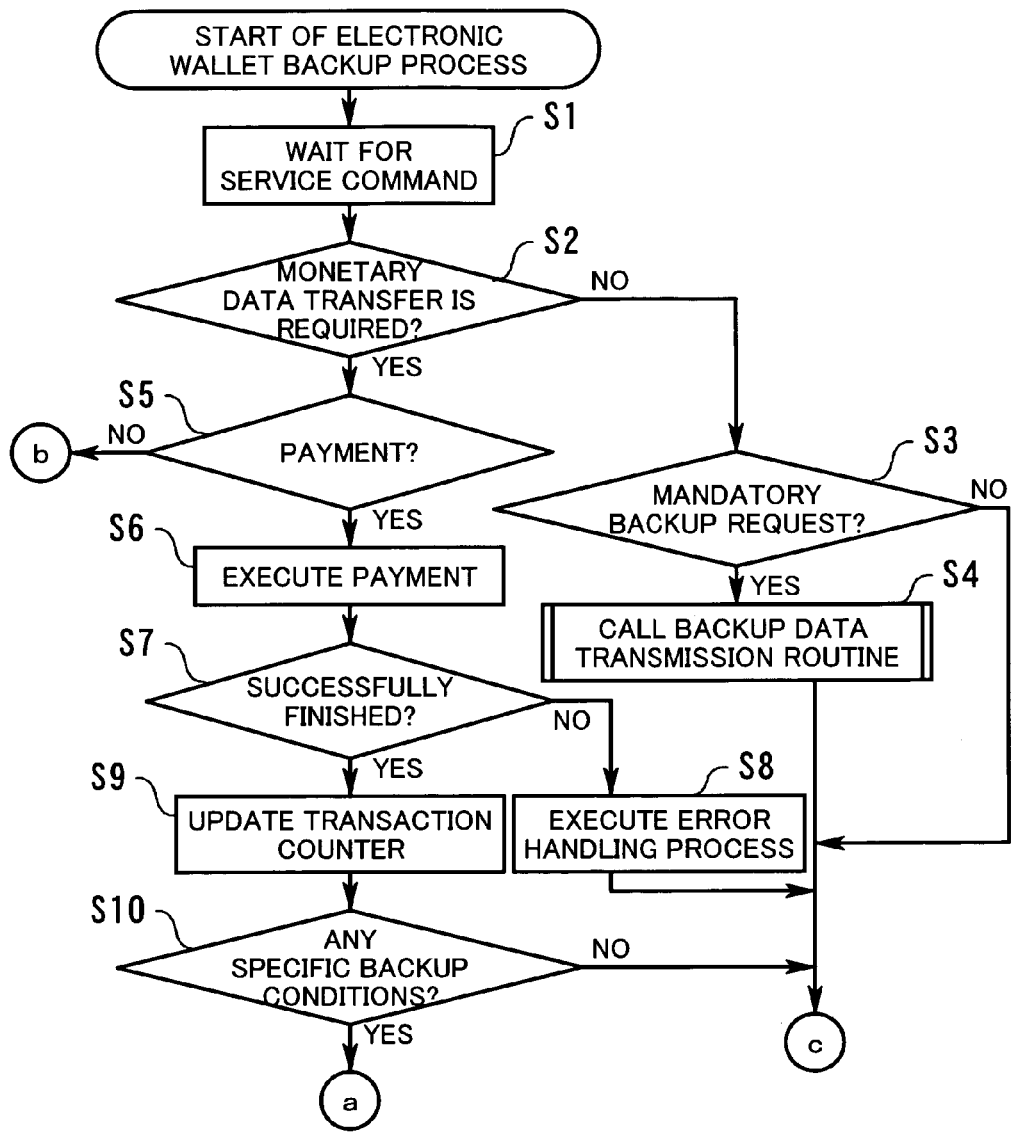
FIG. 8 is the first part of a flowchart which shows a backup process for an electronic wallet device.

FIG. 8 is the first part of a flowchart which shows a backup process for an electronic wallet device. Suppose that a user has inserted his/her electronic wallet device into a terminal station (e.g., ATM) in an attempt to initiate a certain financial operation, where the terminal station is linked to the electronic wallet management unit 50 via a network. In this context, the following processing steps are executed by the electronic wallet device being inserted to the terminal station.

- (S1) The electronic wallet device waits for the user to enter a service command.
- (S2) The device determines whether the entered command invokes any transfer of monetary data. If so, the process advances to step S5. If not, the process branches to step S3.
- (S3) The device determines whether the entered command is a mandatory backup request. Here, the term "mandatory backup request" denotes that the owner of the electronic wallet device is requesting a backup operation. If it is a mandatory backup request, the process advances to step S4. If not, the present process is terminated.
- (S4) The device exits from the current process after calling a backup data transmission routine.
- (S5) The device determines whether the entered command is intended for a payment of money. If so, the process advances to step S6. If not, the process branches to step S21 (see FIG. 10).
- (S6) The device executes a payment process.
- (S7) The device determines whether the payment has successfully finished. If the payment was successful, the process advances to step S9. If it was not successful, the process proceeds to step S8.
- (S8) The device exits from the current process after executing an error handling routine.
- (S9) The device updates the count of money transfer operations. That is, it increments the Online Transaction Counter by one.
- (S10) The device determines whether any specific condition is set in the Backup Condition Data sub-segment. If so, the process advances to step S11 (see FIG. 9). If not, the process is terminated.

Figure 9:
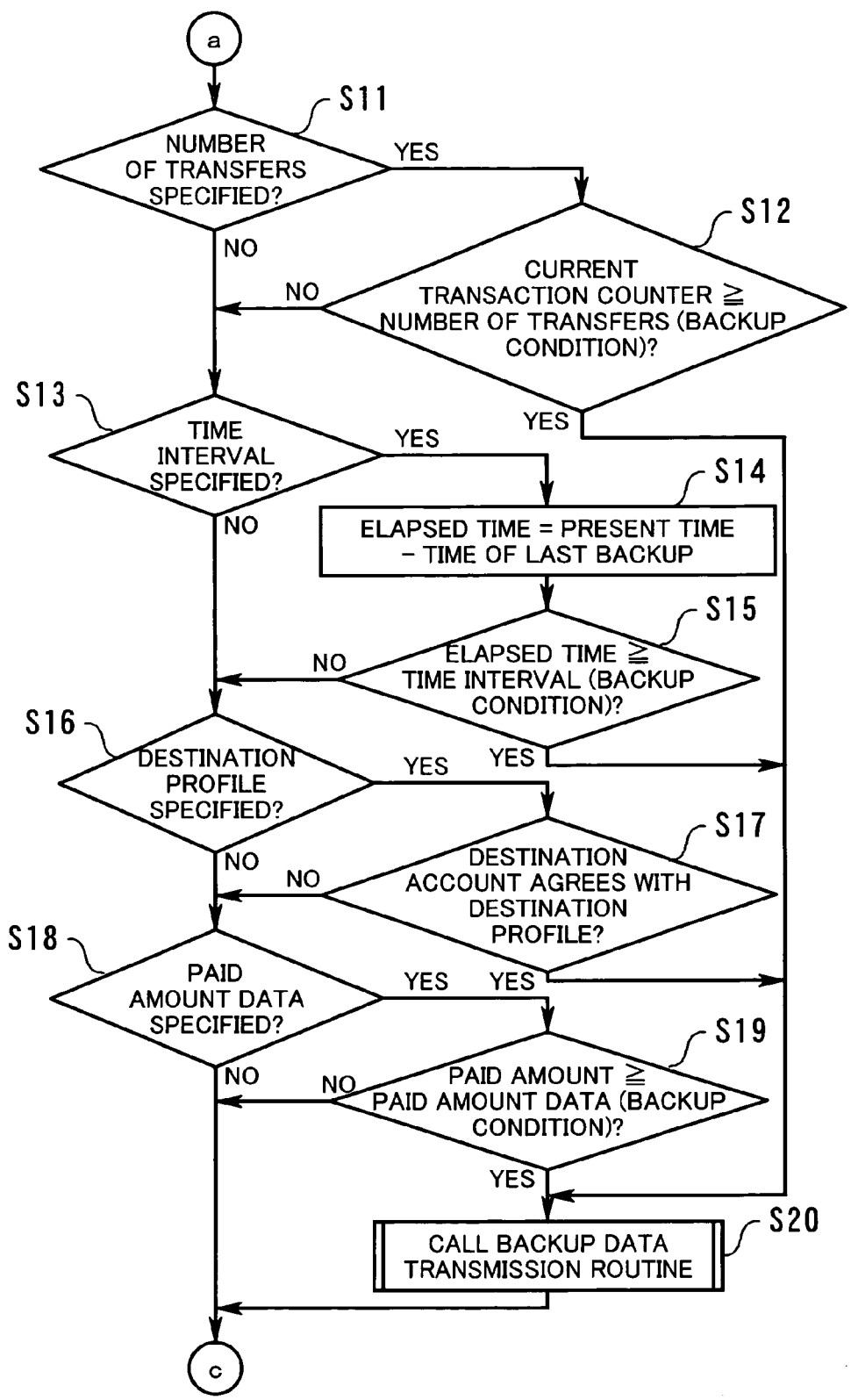
FIG. 9 is the second part of the same flowchart.

FIG. 9 is the second part of the flowchart of the backup process.

- (S11) The device determines whether any specific condition is set in the Number of Transfers field. More specifically, this condition is used when the Backup Type is set to either of the following two modes: once every n transactions; and at the earliest occasion of "once every n transactions" and "once every n days/ hours." If this is the case, a critical value of "Number of Transfers" must be set in the Backup Interval Parameters section. The process advances to step S12 if any specific condition is set in that data field. If not, the process proceeds to step S13.
- (S12) The device determines whether the online transaction counter is equal to or greater than the current backup interval setting (i.e., Number of Transfers). If so, the process branches to step S20. If not, the process advances to step S13.
- (S13) The device determines whether any specific condition is set in the Time Interval field. More specifically, this condition is used when the Backup Type is set to either of the following two modes: once every n days/hours; and at the earliest occasion of "once every n transactions" and "once every n days/hours." If any specific condition is set in that Time Interval field, the process advances to step S14. If not, the process proceeds to step S16.
- (S14) The device calculates the difference between the present time and the date and time of the last backup operation, thereby obtaining the elapsed time since the last backup.
- (S15) The device determines whether the time calculated at step S14 is equal to or greater than the Time Interval parameter that has previously been defined as a backup condition. If so, the process branches to step S20. Otherwise, the process proceeds to step S16.
- (S16) The device determines whether any specific destination account or payment purpose is designated as a backup condition. If there is such a condition, the process advances to step S17. If not, the process proceeds to step S18.
- (S17) The device determines whether the designated destination account or payment purpose agrees with what is set in the Destination Profile field that has been defined as a backup condition. If so, the process advances to step S20. If not, the process returns to step S18.
- (S18) The device determines whether any specific condition is set in the Paid Amount Data field. If there is such a condition, the process advances to step S19. If not, the process is terminated.
- (S19) The device determines whether the amount of the money paid this time is equal to or greater than what is set as a backup condition in the Paid Amount Data field. If so, the process advances to step S20. If not, the process is terminated.
- (S20) The device calls up a backup data transmission routine and then exits from the current process.

Figure 10:
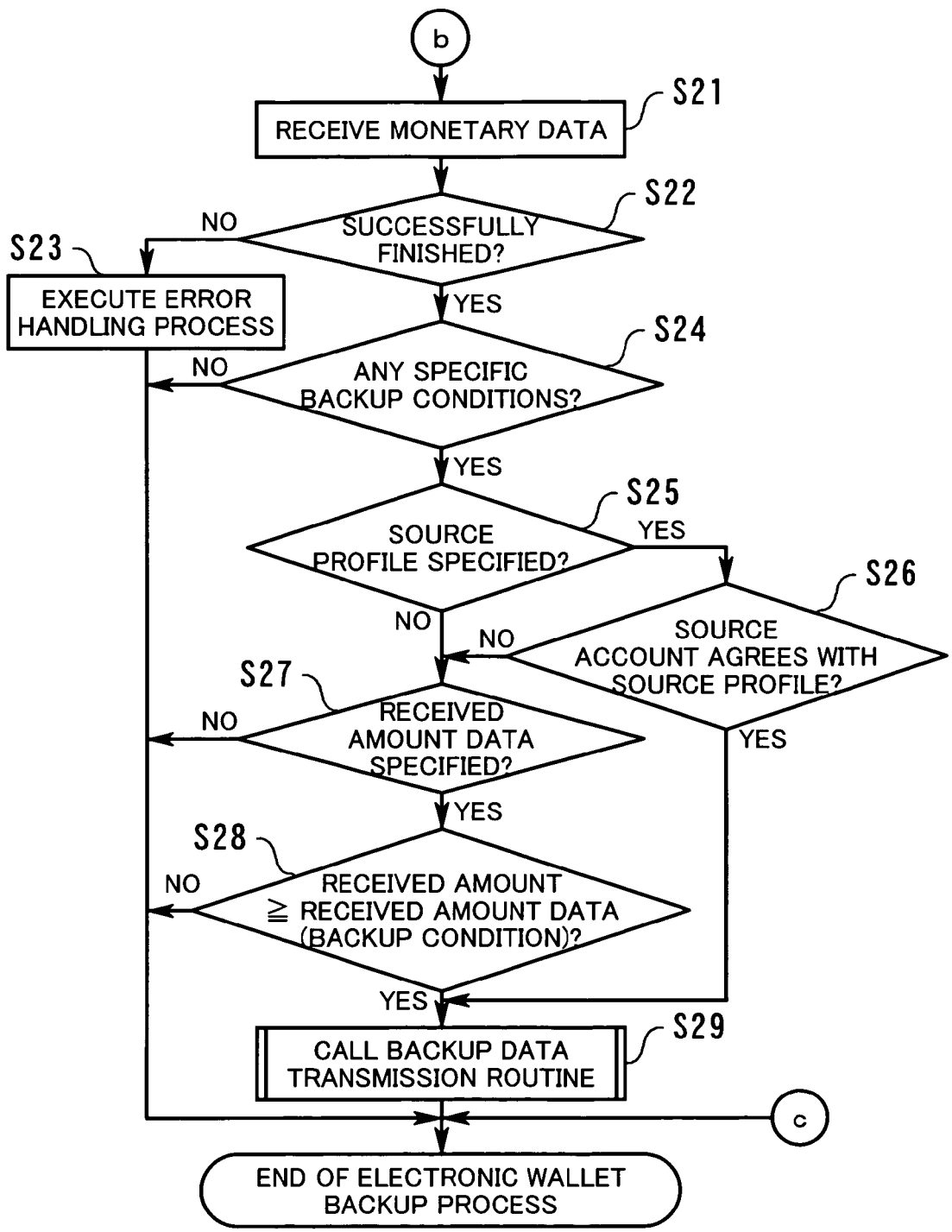
FIG. 10 is the third part of the same flowchart.

FIG. 10 is the third part of the same flowchart of the backup process.

- (S21) The device receives monetary data.
- (S22) The device determines whether the reception process has finished successfully. If so, the process advances to step S24. If not, the process branches to step S23.
- (S23) The device exits from the current process after executing an error handling routine.
- (S24) The device determines whether any specific condition is set in the Backup Condition Data sub-segment. If there is such a condition, the process advances to step S25. If not, the process is terminated.
- (S25) The device determines whether any specific condition is set in the Source Profile field. If there is such a condition, the process advances to step S26. If not, the process proceeds to step S27.
- (S26) The device determines whether the information about the source account of the present transaction agrees with what is set as a backup condition in the Source Profile field. If so, the process advances to step S29. If not, the process proceeds to step S27.
- (S27) The device determines whether any specific condition is set in the Received Amount Data field. If there is such a condition, the process advances to step S28. If not, the process is terminated.
- (S28) The device determines whether the amount of the received money is equal to or greater than what is set as a backup condition in the Received Amount Data field. If so, the process advances to step S29. If not, the process is terminated.

(S29) The device calls a backup data transmission routine.

Figure 11:
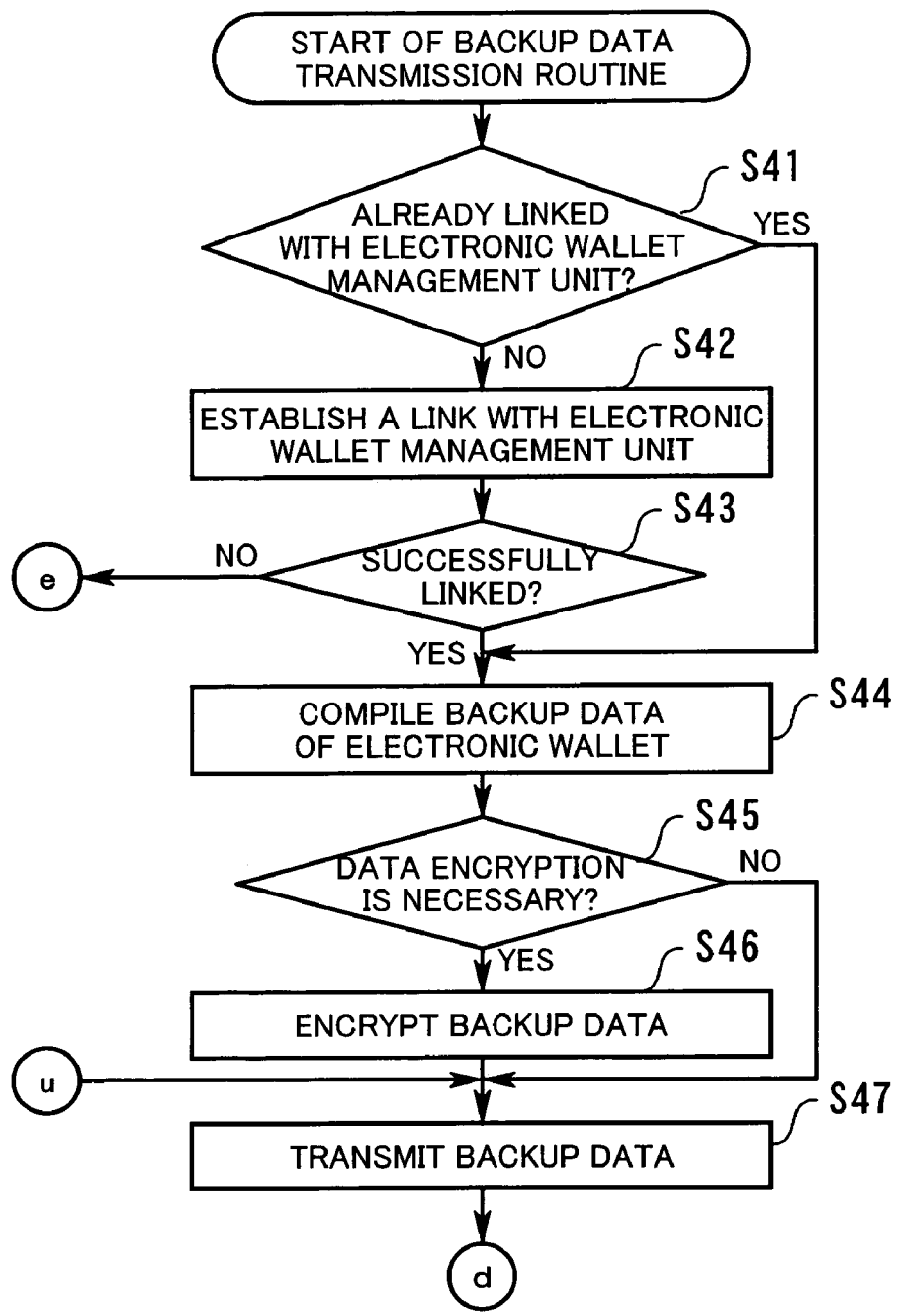
FIG. 11 is the first half of a flowchart showing a backup data transmission process.

FIG. 11 is the first half of a flowchart showing the backup data transmission process.

(S41) The electronic wallet device determines whether the device itself has already been linked with the electronic wallet management unit. If so, the process skips to step S44. If not, the process proceeds to step S42.

(S42) The device starts to connect itself with the electronic wallet management unit.

Figure 12:
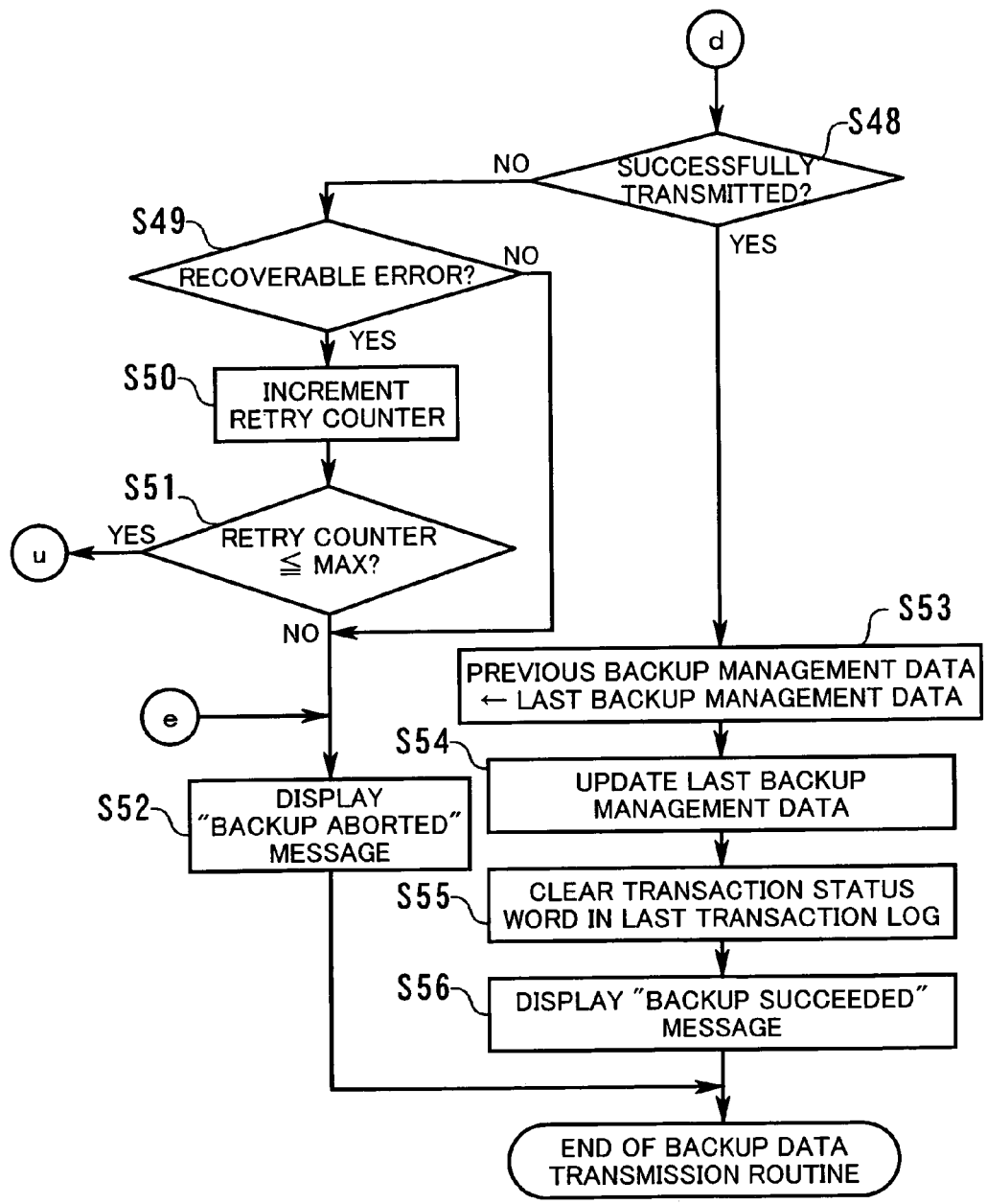
FIG. 12 is the second half of the same flowchart.

(S43) The device determines whether it has successfully established a link with the electronic wallet management unit. If so, the process advances to step S44. If not, the process branches to step S52 (FIG. 12).

(S44) The device compiles backup data by collecting data blocks that have to be backed up.

(S45) The device determines whether it is necessary to encrypt the backup data. If it is necessary, the process advances to step S46. If not, the process skips to step S47.

(S46) The device encrypts the backup data.

(S47) The device transmits the backup data.

FIG. 12 is the second half of the same flowchart.

(S48) The device determines whether the data transmission has successfully finished. If so, the process advances to step S53. If not, the process branches to step S49.

(S49) The device determines whether it can recover from the error by retrying the data transmission. If it can, the process advances to step S50. If not, the process skips to step S52.

(S50) The device increments its retry counter by one.

(S51) The device determines whether the retry counter value is equal to or smaller than a maximum retry count, which has previously been set to the electronic wallet device itself or to a terminal station such as ATM. If the above is true, the process returns to step S47 (FIG. 11). Otherwise, the process advances to step S52.

(S52) The device displays an error message on a monitor screen to indicate that the backup operation has been aborted unsuccessfully.

(S53) The device overwrites the Previous Backup Management Data section by transferring data from the Last Backup Management Data section.

(S54) The device updates the Last Backup Management Data section, so that it will describe how the backup operation has been made this time.

(S55) The device clears the Transaction Status Word in the Last Transaction Log.

(S56) The device displays a notification message on the monitor screen to indicate that the backup operation has finished successfully. The process is now terminated accordingly.

Through the above processing steps, the electronic wallet device sends a copy of its memory content to the electronic wallet management unit, and the backup copy is maintained in the management unit. This operation is performed fully automatically, without requiring the owner of the device to give any explicit instructions to the system.

Although an electronic wallet device can possibly be lost or broken down, the backup copy of its memory data permits the electronic wallet management unit to restore the original electronic wallet data therefrom. This means that the owner can get his/her electronic wallet device reissued quickly. The reissuance of electronic wallet devices, however, may require a few days to finish necessary paperwork and other routine tasks. It would therefore be beneficial to customers if the system could reissue an electronic wallet device for temporary use immediately when they submitted a loss report about their own electronic wallet devices.

Figure 13:
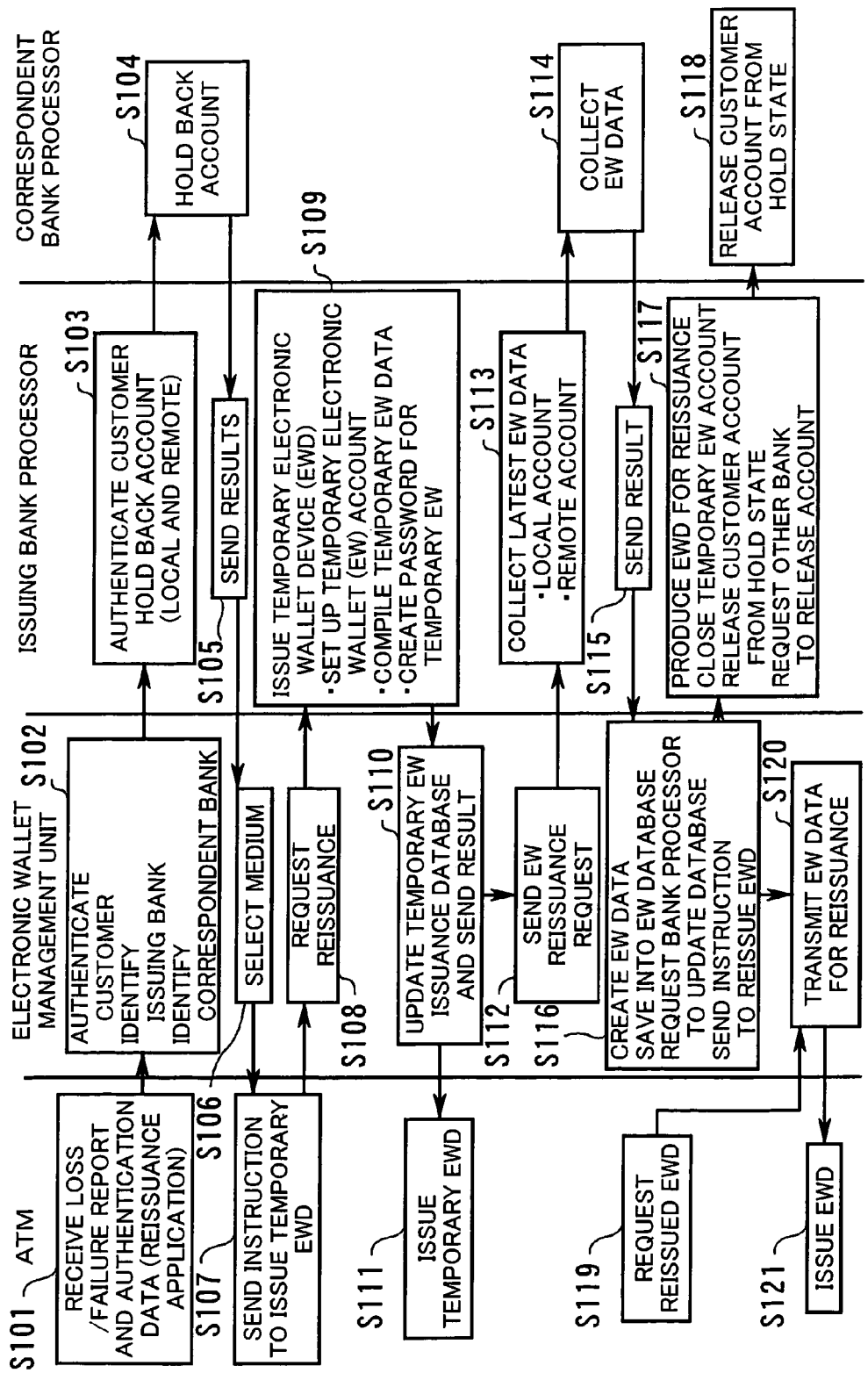
FIG. 13 is a diagram which shows how an electronic wallet device is reissued.

FIG. 13 shows how the proposed system reissues an electronic wallet device. This figure is divided into four sections to illustrate what processing steps are executed in an ATM, an electronic wallet management unit, an issuing bank processor, and a correspondent bank processor.

(S101) The ATM receives a report describing a loss or failure of an electronic wallet device, together with the customer's authentication data (password). Those two pieces of information are then sent to the electronic wallet management unit via a network.

(S102) The electronic wallet management unit authenticates the customer, as well as identifying the issuing bank and its correspondent bank. It then forwards the loss report and user authentication data to the issuing bank processor.

(S103) The issuing bank processor authenticates the customer and holds back his/her accounts. Here, holding back an account means disabling any fund withdrawal from that account, except for direct debit. The issuing bank processor also informs its correspondent bank of the loss of the customer's electronic wallet device.

(S104) The correspondent bank processor holds back the account of the customer (i.e., the loser), and so notifies the issuing bank processor.

(S105) The issuing bank processor informs the electronic wallet management unit that the customer's accounts are now being held back.

(S106) The electronic wallet management unit requests the ATM to interact with the customer to determine what kind of device should be used as an electronic wallet medium. Temporary electronic wallet devices may be provided in the form of small IC card type devices, or such electronic wallet devices that have network interface capabilities.

(S107) The ATM displays a selection dialog prompting the customer to choose which medium should be used for a temporary electronic wallet device that he/she will receive. Receiving an input from the customer, the ATM notifies the electronic wallet management unit of the customer's choice.

(S108) The electronic wallet management unit transmits a reissuance request to the issuing bank.

(S109) The issuing bank processor issues a temporary electronic wallet device. More specifically, the process includes the following tasks: setting up a temporary electronic wallet account, compiling temporary electronic wallet data, and creating a password for the temporary electronic wallet device.

(S110) In its temporary electronic wallet issuance database, the electronic wallet management unit saves a record about the new temporary electronic wallet to be issued, the result of which is then sent to the ATM.

(S111) The ATM issues the temporary electronic wallet device.

Through the above processing steps, a temporary electronic wallet device is issued. This is followed by another process which reissues officially the lost or failed electronic wallet device.

(S112) The electronic wallet management unit transmits an electronic wallet reissuance request to the issuing bank processor.

(S113) The issuing bank processor collects the latest electronic wallet data related to the customer in question. In addition to searching its own local account database, the issuing bank processor communicates with the correspondent bank processor through sending a data collection request.

(S114) Receiving the data collection request, the correspondent bank processor collects information relevant to the customer's electronic wallet and sends the result back to the issuing bank processor.

(S115) The issuing bank processor supplies the electronic wallet management unit with the collected data.

(S116) Based on the latest electronic wallet data collected in this way, the electronic wallet management unit creates a new set of electronic wallet device data and saves it into the electronic wallet database. The electronic wallet management unit then requests the issuing bank processor to update its database, and it then commands the reissuance of an electronic wallet device.

(S117) The issuing bank processor records the information about the reissued electronic wallet device into its electronic wallet device manager and closes the temporary electronic wallet account. At the same time, it releases the customer's account from the hold back state, as well as sending an account release request to the correspondent bank.

(S118) The correspondent bank releases the customer's account from the hold back state.

(S119) The ATM asks the electronic wallet management unit to transfer the reissued electronic wallet device so that the customer can receive it.

(S120) Upon receipt of the request, the electronic wallet management unit supplies the ATM with data that is to be stored in the memory of an electronic wallet device to be physically reissued.

(S121) Receiving the data from the electronic wallet management unit, the ATM writes it into the memory of the previously selected medium, thereby creating a new electronic wallet device. The ATM then issues this device to the requesting customer in exchange for the temporary electronic wallet device that he/she has.

In this way the proposed system immediately provides a temporary electronic wallet device in order to help the customer when his/her electronic wallet device is lost or broken down. Because the stored backup copy is relatively fresh, the proposed system can reissue an electronic wallet device in a prompt manner.

The details of the aforementioned reissuance application process and subsequent electronic wallet reissuing process will now be described below. The following section, however, will focus on the processing at the ATM and electronic wallet management unit. Processes to be executed at the issuing bank processor and the like (e.g., holing back an account) will not be explained here. It is also assumed that there is only one type of electronic wallet medium available, which eliminates the need for choosing a medium.

First, the reissuance application process will be described in detail below. This process is invoked when a customer who lost his/her electronic wallet device enters a command to an ATM to request its reissuance. In response to the command, the ATM displays a reissuance application menu on its monitor screen.

Figure 14:
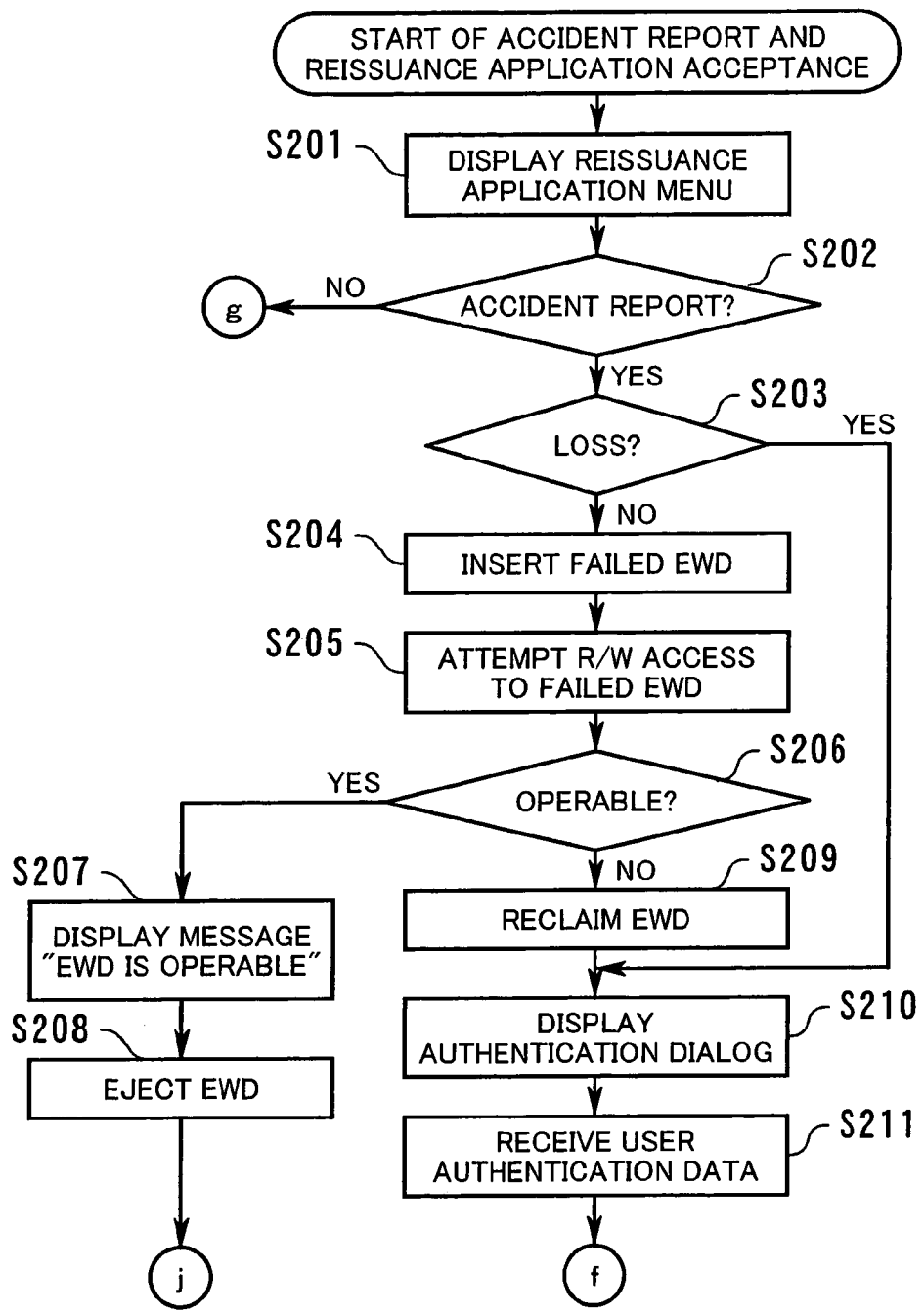
FIG. 14 is the first part of a flowchart showing a process of reporting an accident of an electronic wallet and having it reissued.

FIG. 14 is the first part of a flowchart showing a process in which the customer reports an accident happened to his/her electronic wallet, as well as making an application of its reissuance.

(S201) The ATM displays a reissuance application menu on its monitor screen and receives a command selected by the customer.

Figure 15:
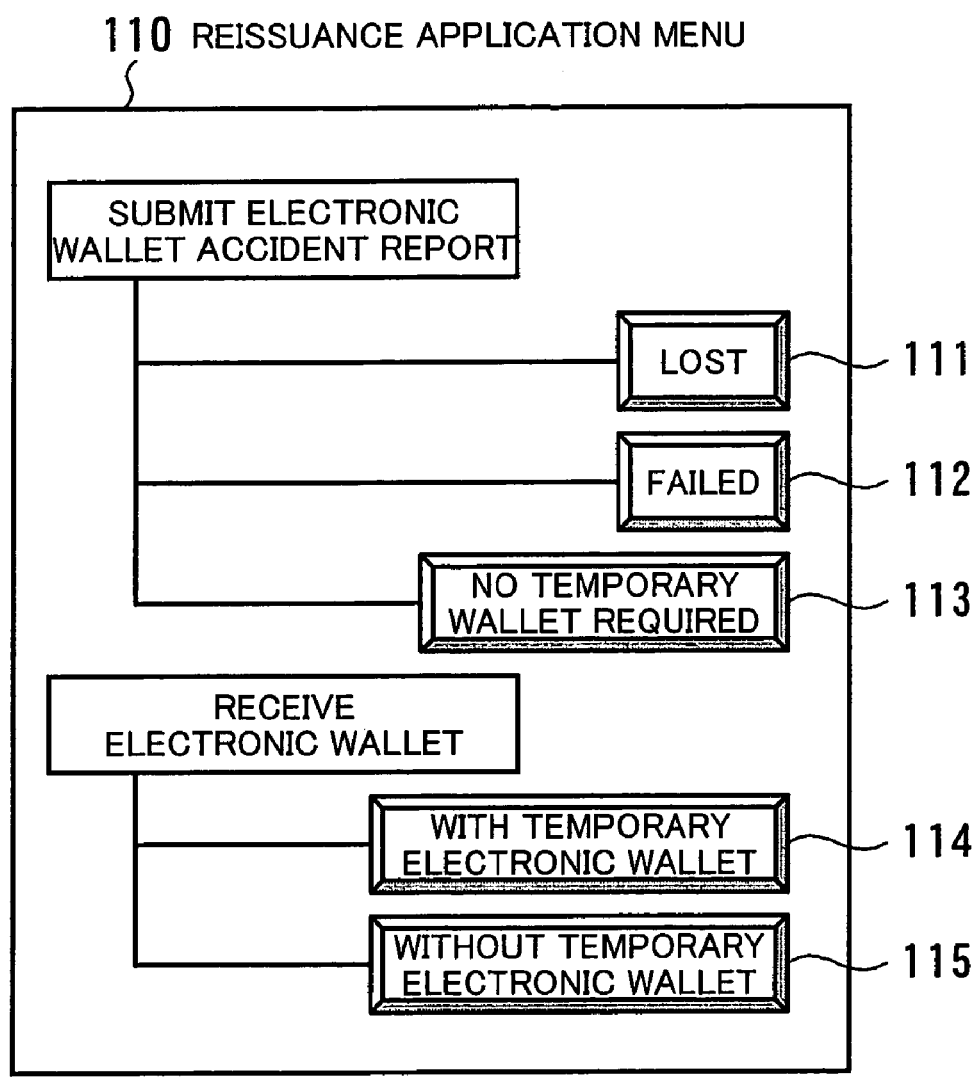
FIG. 15 is a diagram showing an example screen shot of reissuance application menu.

FIG. 15 is a diagram showing an example screen shot of the reissuance application menu. This reissuance application menu 110 is composed of two parts entitled "Submit Electronic Wallet Accident Report" and "Receive Electronic Wallet." The menu provides some on-screen buttons for individual selection items.

Under the title of "Submit Electronic Wallet Accident Report," the following three buttons are available: "Lost" button 111, "Failed" button 112, and "No Temporary Wallet Required" button 113. The customer presses the Lost button 111 when his/her electronic wallet device is lost. He/she presses the Failed button 112 when his/her electronic wallet device becomes inoperative. Or the customer may presses the No Temporary Wallet Required button 113 when his/her electronic wallet is lost or inoperable but he/she does not need a temporary electronic wallet.

Under the title of "Receive Electronic Wallet," on the other hand, a "With Temporary Electronic Wallet" button 114 and a "Without Temporary Electronic Wallet" button 115 are provided. The customer presses the button 114 when he/she wishes to have his/her lost electronic wallet reissued, in addition to receiving a temporary electronic wallet device. He/she may press the other button 115, wishing the reissuance, but without receiving a temporary electronic wallet device.

Pressing any of the above buttons in the reissuance application menu will causes the present processing to execute step S202 and subsequent steps (FIG. 14).

Figure 18:
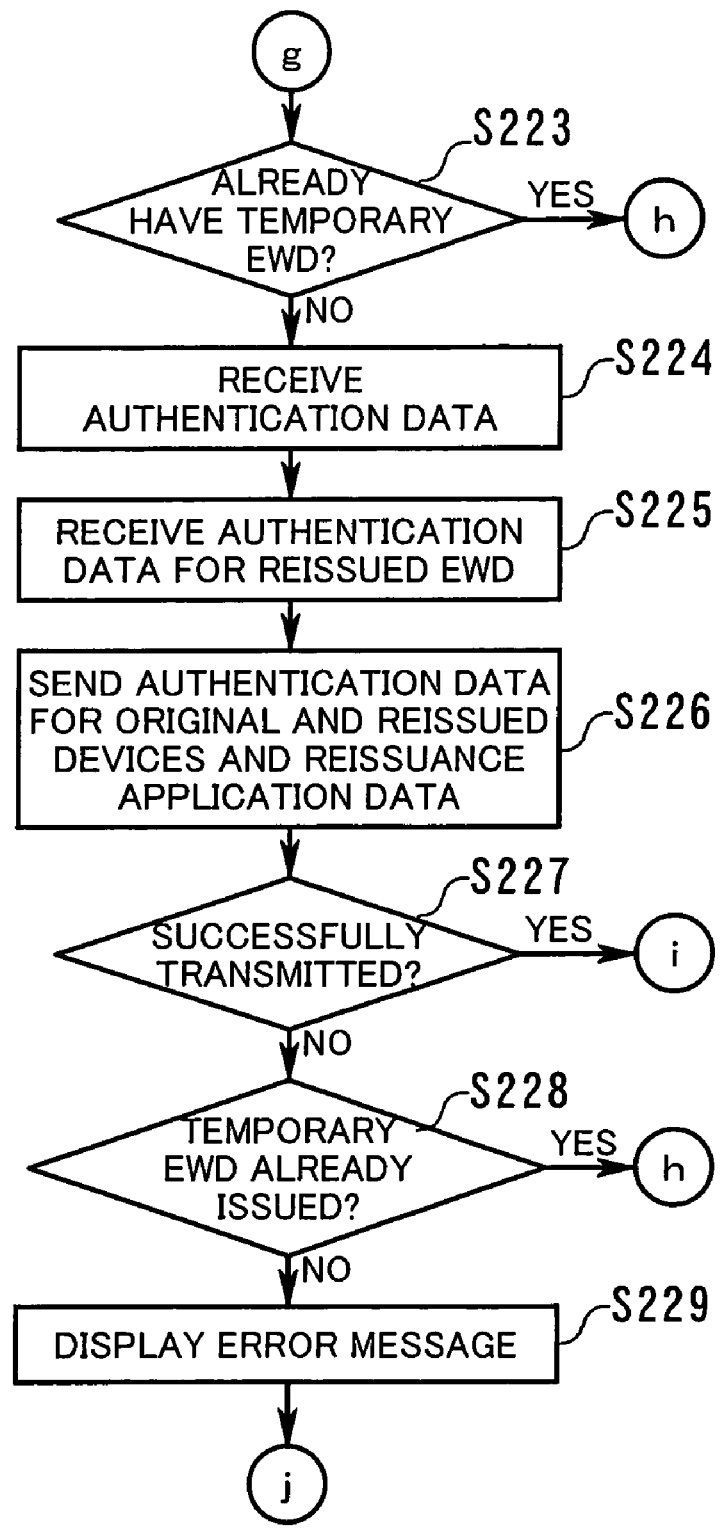
FIG. 18 is the third part of the same flowchart.

(S202) The ATM determines whether the customer is submitting an accident report. If so, the process advances to step S203. Otherwise, it is interpreted that the customer wishes to receive a reissued electronic wallet, and therefore the process branches to step S223 (FIG. 18).

(S203) The ATM determines whether the accident report is actually a loss report. If so, the process advances to step S210. If not, the process proceeds to step S204, since it implies that the accident report indicates device failure.

(S204) The customer inserts his/her failed electronic wallet device to the ATM.

(S205) The ATM attempts to read and write the inserted electronic wallet device for testing purposes.

(S206) The ATM checks whether the result of the above access test suggests that the device is operable. If so, the process proceeds to step S207. If not, the process advances to step S209.

(S207) The ATM displays a message on its monitor screen to indicate that the electronic wallet device is normal.

(S208) The ATM ejects the inserted electronic wallet device and terminates the current process.

(S209) The ATM traps the inserted electronic wallet device for reclaiming.

(S210) The ATM displays a dialog on its monitor screen to prompt the customer to enter his/her authentication data.

Figure 16:
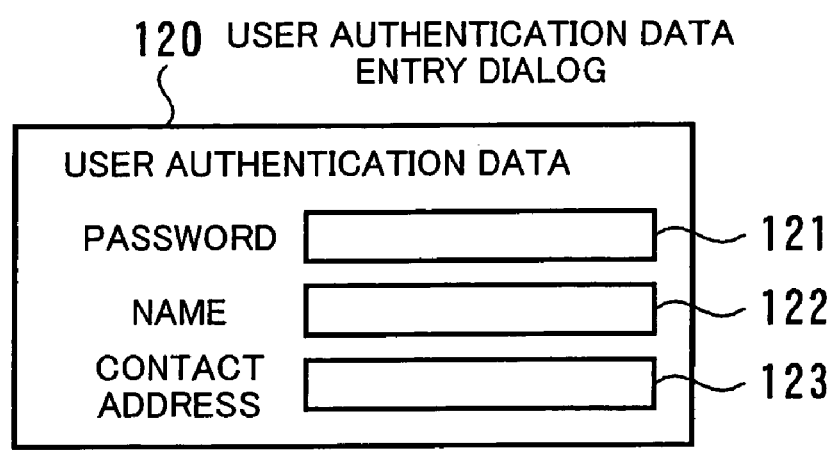
FIG. 16 is a diagram showing an example screen shot of a user authentication data entry dialog.

FIG. 16 is a diagram showing an example screen shot of this user authentication data entry dialog. This dialog 120 has the following three elements: a first text box 121 for entering a password; a second text box 122 for entering the customer's name; and a third text box 123 for entering his/her contact address information.

(S211) The customer enters his/her user authentication data (e.g., his/her account number and password) to each text box 121 to 123.

Figure 17:
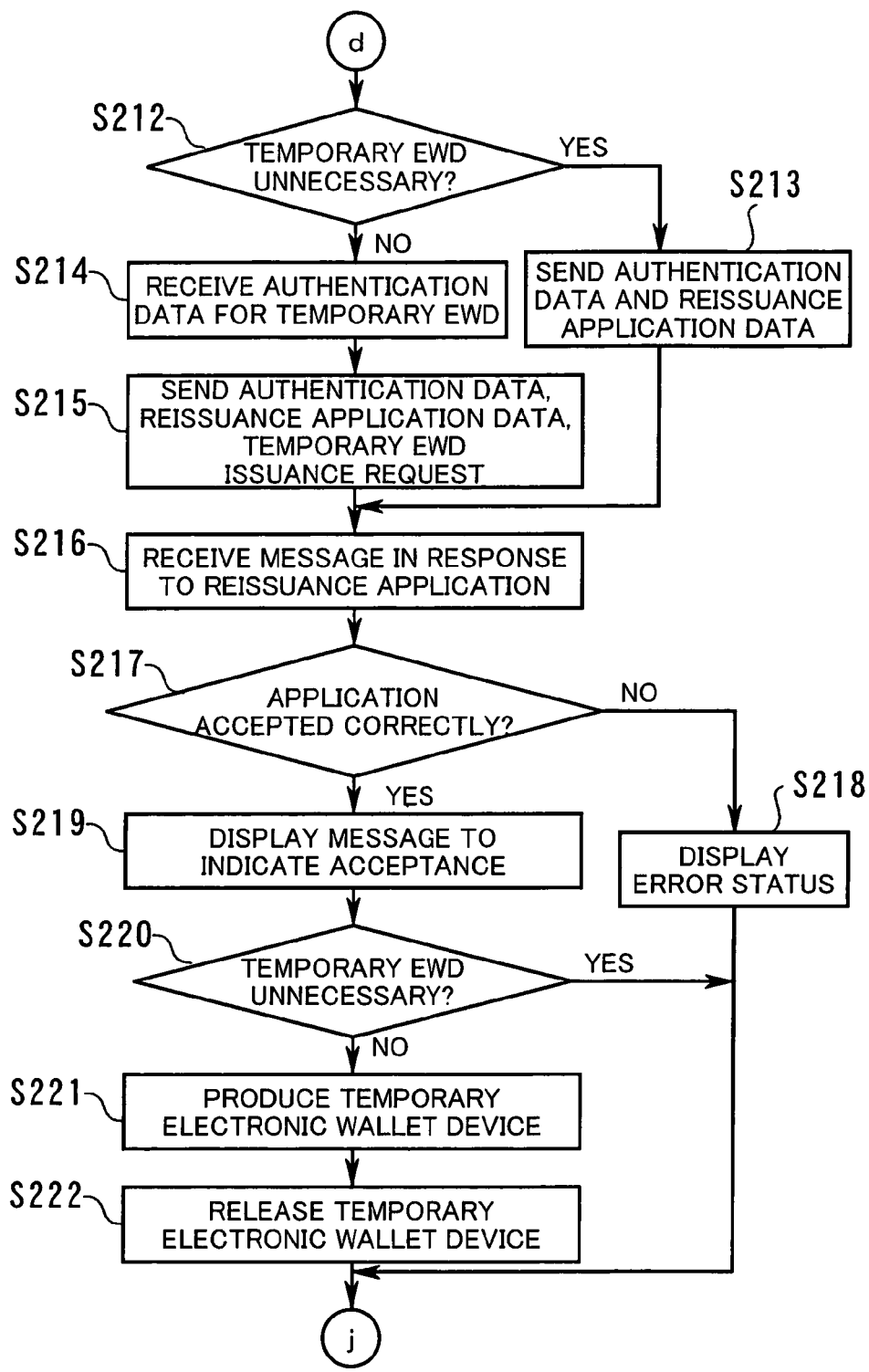
FIG. 17 is the second part of the flowchart showing the process of reporting an accident of an electronic wallet and having it reissued.

FIG. 17 is the second part of the flowchart showing the same process.

(S212) The ATM determines whether it is unnecessary to issue a temporary electronic wallet device, based on what the customer selected from the reissuance application menu. If the customer does not need a temporary electronic wallet, the process advances to step S213. Otherwise, the process goes to step S214.

(S213) The ATM sends the user authentication data and reissuance application data to the electronic wallet management unit. The process then proceeds to step S216.

(S214) The customer enters his/her user authentication data for the forthcoming temporary electronic wallet device.

(S215) The ATM transmits the user authentication data, reissuance application data, and temporary electronic wallet device issuance request to the electronic wallet management unit.

(S216) The ATM receives a message that the electronic wallet management unit sends in response to the customer's reissuance application. In the case that the submitted application included a request for a temporary electronic wallet device, the response message is accompanied by a data set that should be written into the memory of the temporary electronic wallet device to be issued.

(S217) The ATM determines whether the reissuance application has been accepted correctly by the electronic wallet management unit. If so, the process advances to step S219. If not, the process branches to step S218.

(S218) The ATM displays error status information on its monitor screen and exits from the current process.

(S219) The ATM displays a message to indicate that the reissuance request has been accepted successfully by the electronic wallet management unit.

(S220) The ATM determines whether it is unnecessary to issue a temporary electronic wallet device. The process is terminated if no temporary electronic wallet device is necessary. Otherwise, the process advances to step S221.

(S221) The ATM produces a temporary electronic wallet device. More specifically, it writes the valid period, user authentication data, credit limit, and other various data elements into the memory of an electronic wallet medium stocked in the ATM.

(S222) The ATM ejects the produced temporary electronic wallet device and exits from the process.

FIG. 18 is the third part of the same flowchart.

Figure 19:
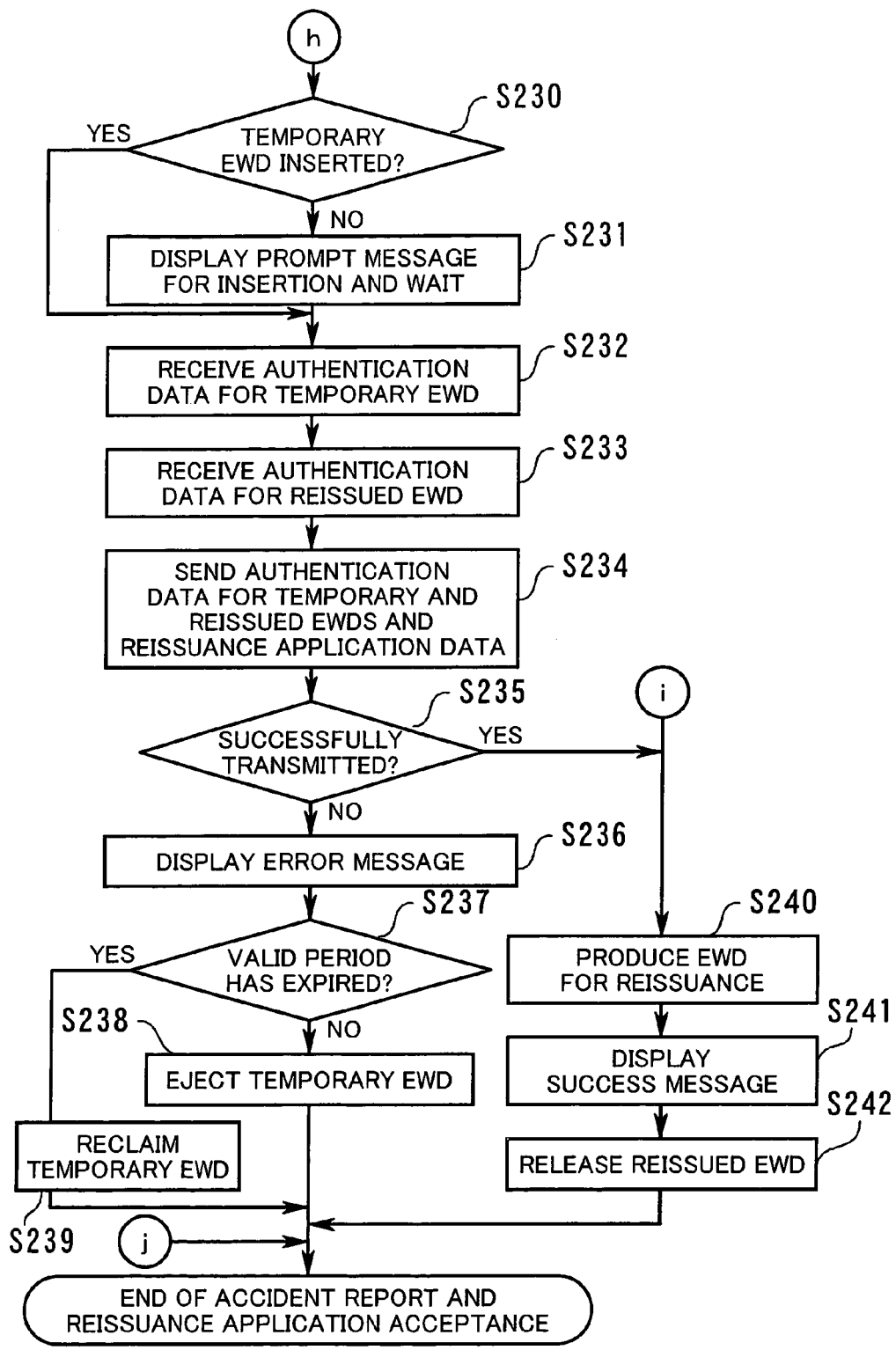
FIG. 19 is the fourth part of the same flowchart.

(S223) The ATM determines whether the customer has already received a temporary electronic wallet device. Actually, this is determined by identifying which button the customer has pressed, the upper button 114 or the lower button 115. The former button implies that a temporary wallet was issued, while the latter button means no temporary wallet was issued. If the customer has a temporary wallet, the process goes to step S230 (FIG. 19). Otherwise, the process advances to S224.

(S224) The customer enters his/her user authentication data of the lost electronic wallet device.

(S225) The customer enters his/her user authentication data for a new electronic wallet device to be reissued.

(S226) The ATM transmits the reissuance application data to the electronic wallet management unit, together with the above two sets of user authentication data entered by the customer. If this data transfer is successfully finished, the electronic wallet management unit returns a data set that should be written into the memory of a new electronic wallet device to be reissued.

(S227) The ATM determines whether the data transfer was successful. If so, the process branches to step S240 (FIG. 19). If not, the process proceeds to step S228.

(S228) The ATM determines whether the error information suggests that the system has already issued a temporary electronic wallet device to the customer. If so, the process advances to step S230. If not, the process proceeds to step S229.

(S229) The ATM displays an error message on its monitor screen.

FIG. 19 is the forth part of the same flowchart.

(S230) The ATM examines whether a temporary electronic wallet device has been inserted thereto. If so, the process skips to step S232. If not, the process proceeds to step S231.

(S231) The ATM displays a message to prompt the customer to insert a temporary electronic wallet device, and waits for the insertion. The customer then inserts his/her temporary electronic wallet device into the ATM.

(S232) The customer enters his/her temporary user authentication data for the temporary electronic wallet device.

(S233) The customer enters his/her user authentication data for the reissued version of the electronic wallet device.

(S234) The ATM transmits the reissuance application data to the electronic wallet management unit, together with the above two sets of user authentication data entered by the customer. If this data transfer is successfully finished, the electronic wallet management unit returns a data set that should be written into the memory of a new electronic wallet device to be reissued.

(S235) The ATM determines whether the data transfer was successful. If so, the process advances to step S240. If not, the process proceeds to step S236.

(S236) The ATM displays an error message on the monitor screen.

(S237) The ATM determines whether the valid period of the temporary electronic wallet device has already expired. If so, the process advances to step S239. If not, the process proceeds to step S238.

(S238) The ATM ejects the temporary electronic wallet device and exits from the process.

(S239) The ATM traps and collects the temporary electronic wallet device and exits from the process.

(S240) The ATM prepares an electronic wallet device for reissuance. More specifically, it writes the user authentication data, financial institution data, and other various data to the memory of an electronic wallet medium stocked in the ATM.

(S241) The ATM displays a message on the monitor screen to indicate that the reissuance process has successfully finished.

(S242) The ATM outputs the reissued electronic wallet device and exits from the process.

The above section has described how the ATM handles a reissuance application for an electronic wallet device. The electronic wallet management unit responds to this application by executing an electronic wallet issuing process.

Figure 20:
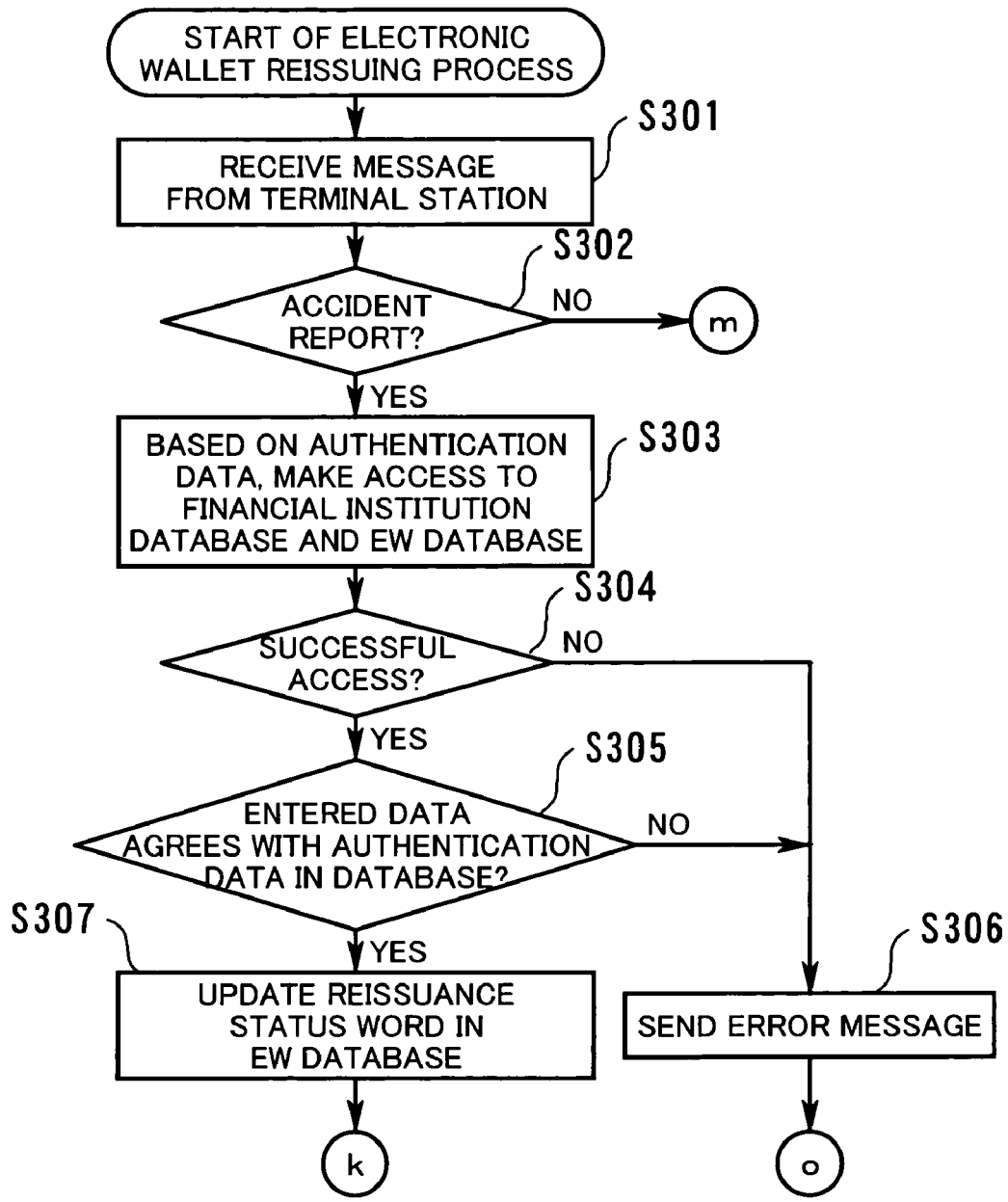
FIG. 20 is the first part of a flowchart which shows an electronic wallet issuing process.

FIG. 20 is the first part of a flowchart which shows the electronic wallet issuing process. All processing steps constituting this process are executed by the electronic wallet management unit.

(S301) The electronic wallet management unit receives a message from a terminal station (ATM).

Figure 22:
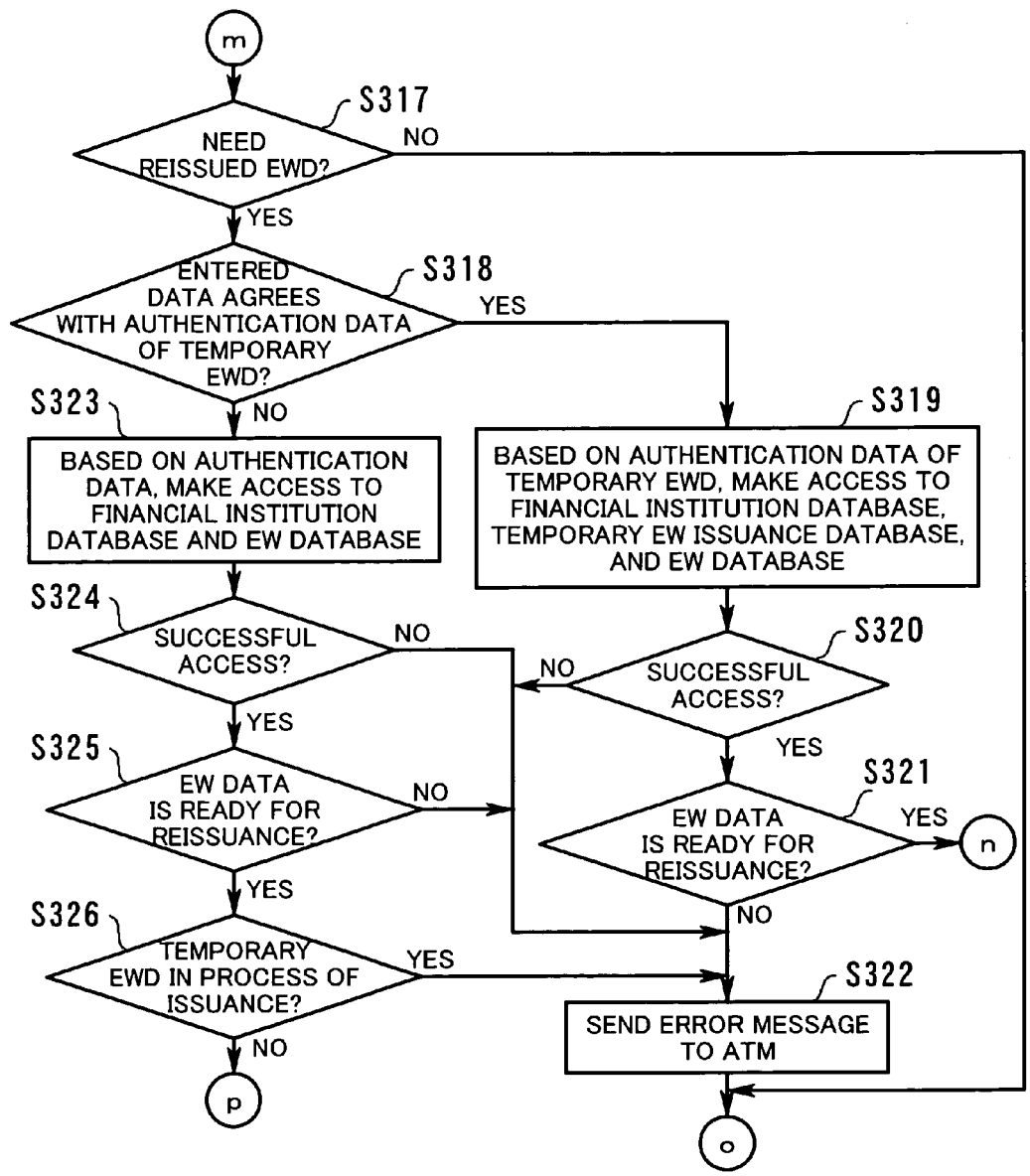
FIG. 22 is the third part of the same flowchart.

(S302) Parsing the received message, the management unit determines whether it is an accident report concerning an electronic wallet device. If so, the process advances to step S303. If not, it means that the customer wishes to receive a reissued electronic wallet device. The process therefore proceeds to step S317 (FIG. 22).

(S303) Based on the user authentication data, the management unit makes access to its local database which functions as the financial institution database and electronic wallet database described earlier.

(S304) The management unit determines whether the database access has successfully been performed. If so, the process advances to step S305. If not, the process proceeds to step S306.

(S305) The management unit determines whether the user authentication data that the customer entered to the ATM agrees with what has been stored in the electronic wallet database for verification purposes. If they agree with each other, the process advances to step S307. If not, the process proceeds to step S306.

(S306) The management unit transmits an error message to the terminal station and then exits from the current process.

(S307) The management unit updates a relevant reissuance status word in the electronic wallet database.

Figure 21:
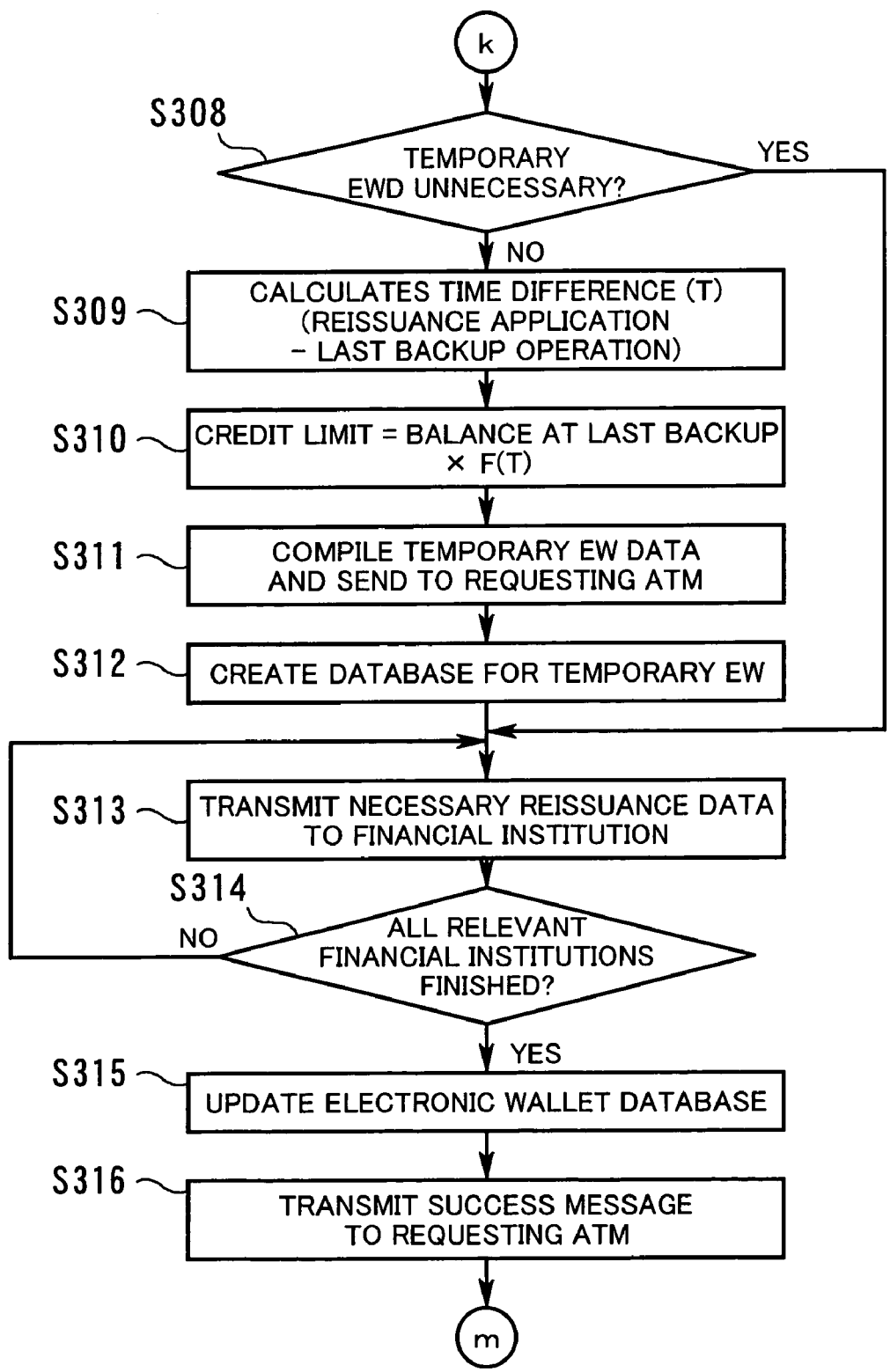
FIG. 21 is the second part of the same flowchart.

FIG. 21 is the second part of the same flowchart.

(S308) The management unit determines whether it is unnecessary to issue a temporary electronic wallet device. The process proceeds to step S313 if no temporary electronic wallet device is required. Otherwise, the process advances to step S309.

(S309) The management unit calculates a time difference (T) between the time when the reissuance application was accepted and the time of the last backup operation.

(S310) The management unit multiplies the balance of the electronic wallet device at the time of the last backup by F(T), a function of the time difference T. It then divides the product by 100, thereby obtaining the credit limit. The function F(T) may be as follows, for example.

$$F(T)=\exp(-T/k) \times MaxCw+(1-\exp(-T/k)) \times MinCw = \exp(-T/k) \times (MaxCw-MinCw)+MinCw \quad (1)$$

where "exp" denotes an exponential function, MaxCw is a maximum creditworthiness [%], MinCw is a minimum creditworthiness [%], T is the time difference ($0 \leq T < \infty$), and k is a constant not smaller than one. The maximum creditworthiness and minimum creditworthiness, each ranging from zero to 100, are previously determined in accordance with the customer's creditworthiness. The maximum creditworthiness must be greater than the minimum creditworthiness. The more creditworthy he/she is, the greater their difference becomes. The value of F(T) equals the maximum creditworthiness in the extreme case where the time difference T is zero (i.e., the time of the last backup equals the time of the reissuance application). F(T) approaches the value of the minimum creditworthiness as the time difference T grows. At infinity (T=∞), F(T) converges to the minimum creditworthiness because exp(-T/k) becomes zero.

(S311) The management unit compiles temporary electronic wallet data and sends it to the requesting ATM.

(S312) The management unit creates a database for managing the temporary electronic wallet.

(S313) Toward a relevant financial institution processor, the management unit transmits data that is necessary for the reissuance.

(S314) The management unit determines whether it has finished all relevant financial institutions. If so, the process advances to step S315. If not, the process returns to step S313.

(S315) The management unit updates relevant records in the electronic wallet database.

(S316) The management unit sends a message to the requesting ATM to indicate that the reissuance has been normally processed so far.

FIG. 22 is the third part of the same flowchart.

(S317) The management unit determines whether the customer wishes to receive a reissued electronic wallet device. If so, the process advances to step S318. If not, the process is terminated.

(S318) The management unit determines whether the user authentication data that the customer entered to the ATM agrees with the authorized data that has been stored in the temporary electronic wallet issuance database. If they agree with each other, the process advances to step S319. If not, the process proceeds to step S323.

(S319) Based on the user authentication data for the temporary electronic wallet device, the management unit makes access to its financial institution database, temporary electronic wallet issuance database, and electronic wallet database. Through this database access, it retrieves the last backup data, transaction log records after the last backup, the credit limit and current balance of the temporary electronic wallet device, and other data. From such information, the electronic wallet management unit determines how much funds to transfer to a new electronic wallet device to be reissued.

(S320) The management unit determines whether the database access has successfully been performed. If so, the process advances to step S321. If not, the process proceeds to step S322.

Figure 23:
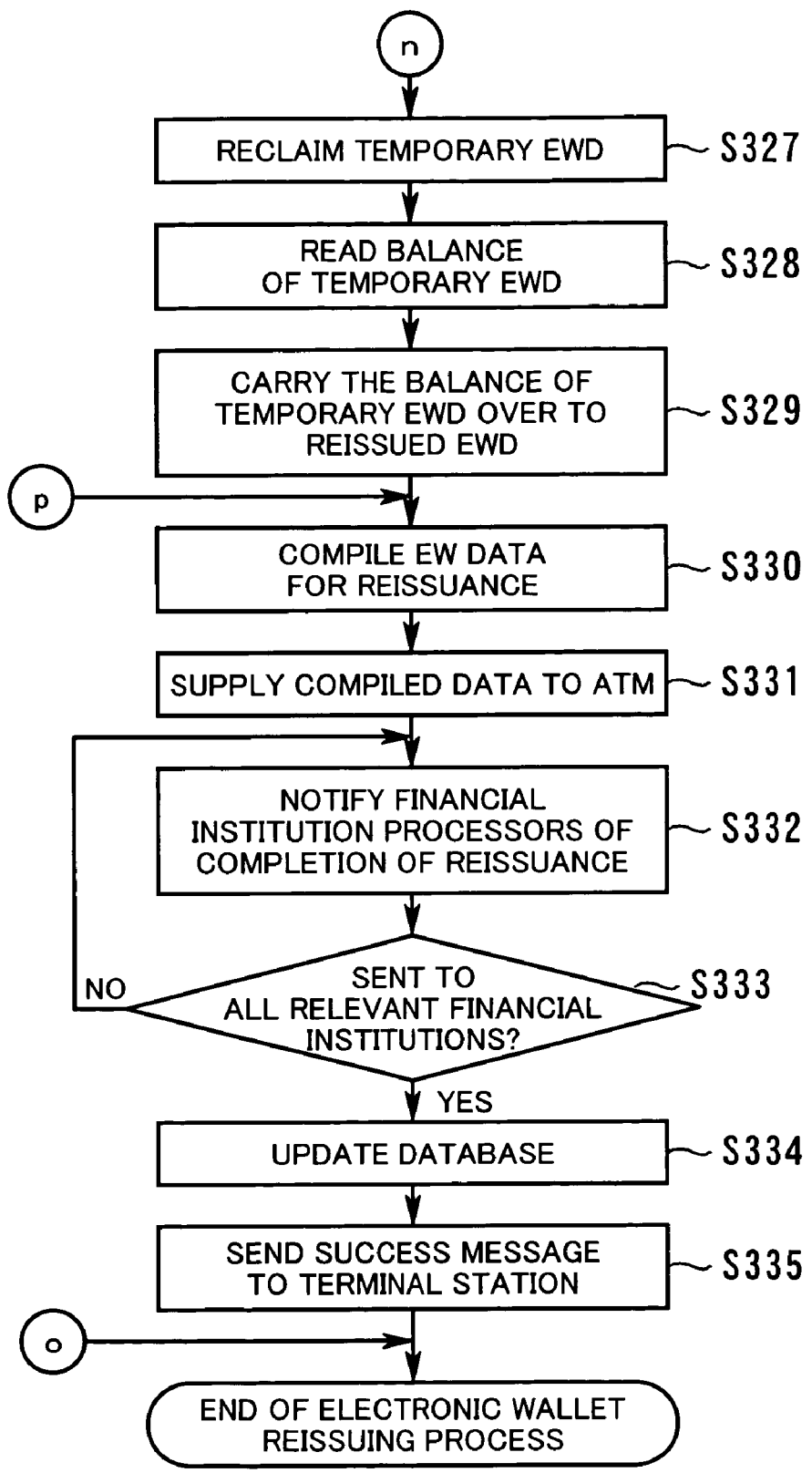
FIG. 23 is the fourth part of the same flowchart.

(S321) The management unit determines whether it has fully prepared the data for a new electronic wallet device. If the data is ready, the process advances to step S327 (FIG. 23). If not, the process proceeds to step S322.

(S322) The management unit sends an error message to the ATM and then exits from the current process.

(S323) Based on the user authentication data, the management unit makes access to its financial institution database and electronic wallet database. Through this database access, it retrieves the last backup data, transaction log records after the last backup, and other relevant data. From such information, the electronic wallet management unit determines how much funds to transfer to the electronic wallet device to be reissued.

(S324) The management unit determines whether the database access is successfully performed. If so, the process advances to step S325. If not, the process proceeds to step S322.

(S325) The management unit determines whether it has fully prepared the data for a new electronic wallet device to be reissued. If so, the process advances to step S326. If not, the process proceeds to step S322.

(S326) The management unit determines whether the temporary electronic wallet device is in process of issuance. If so, the process advances to step S322. If not, the process proceeds to step S330 (FIG. 23).

FIG. 23 is the fourth part of the same flowchart.

(S327) The management unit traps and collects the temporary electronic wallet device.

(S328) The management unit reads the balance of the temporary electronic wallet device.

(S329) The management unit carries the balance of the temporary electronic wallet device over to the electronic wallet device to be reissued.

(S330) The management unit compiles data for the electronic wallet device to be reissued.

(S331) The management unit supplies the compiled data to the ATM.

(S332) The management unit notifies relevant financial institution processors of the completion of reissuance.

(S333) The management unit determines whether it has sent the information to all the relevant financial institutions. If so, the process advances to step S334. If not, the process returns to step S332.

(S334) The management unit removes relevant records from the temporary electronic wallet issuance database.

(S335) The management unit sends a message to the terminal station (ATM) to indicate that the reissuance has successfully finished.

In this way, the customer can receive a temporary electronic wallet device when his/her electronic wallet is lost or broken down. With this temporary electronic wallet device, he/she can make electronic money payments for the time being, without any problem. Also, the system reissues a new electronic wallet device promptly by using the stored backup data. As a result, the proposed system provides several advantages as described below.

The proposed system provides typical backup conditions which are expected to happen in normal financial transactions (both payment and reception). The system makes a backup regularly or on demand when certain important transactions take place. More specifically, the system can be programmed to make a backup in the following occasions: when a certain number of online and offline financial transactions are performed (e.g., once every twenty transactions); at regular intervals (e.g., once everyday, or twice a week); when payment is made to particular payees (e.g., particular telephone company, particular gas company, particular newsdealer, particular laundry); and when payment is made for particular purposes (e.g., bus fares, train fares, payment for purchases through automatic vending machines, payphone charges).

In addition to the above, the amount of money can be specified as a backup condition for any other unclassified transactions. This setup ensures backup operations when a large amount of money (e.g., more than one million yen) is paid or received in a transaction.

When a backup condition is met, the backup process is called up automatically by the system (i.e., requiring no customer input). Therefore, the result of every important transaction has to be recorded in the electronic wallet management unit. Suppose here that a customer lost his/her electronic wallet device. For the above-described reason, it is unlikely that he/she conducted an important transaction after the last backup was made and before his/her account was held down. This justifies the use of backup data as a basis for issuing an alternative electronic wallet device, and thus enables prompt reissuance of an electronic wallet device.

The present invention also allows the customer to receive and use a temporary electronic wallet device in electronic money transactions. This feature is provided as a temporary measure for supporting the customer until his/her electronic wallet device is reissued officially, which may take a couple of days. The credit limit of the temporary electronic wallet device is calculated on the basis of the elapsed time since the last backup operation, as well as depending on the creditworthiness of the customer. While the provision of a temporary electronic wallet device might pose a risk for relevant financial institutions, the above feature of the present invention will minimize that risk.

Further, the proposed system is designed to reclaim a temporary electronic wallet device when an official version is reissued. The collected devices can be reused, which contributes to cost reduction and recycling of resources.

While the invention has been explained on the assumption that the customer interacts with a reissuance application menu to some extent to get his/her electronic wallet device reissued, the system may also be configured to reissue it in a more automated fashion. That is, when a temporary electronic wallet device is in use, the system checks whether the preparation of the reissuance is done. If the system is ready, the customer can readily obtain a reissued electronic wallet device. The next section will explain how the above service is realized at a terminal station (ATM).

Figure 24:
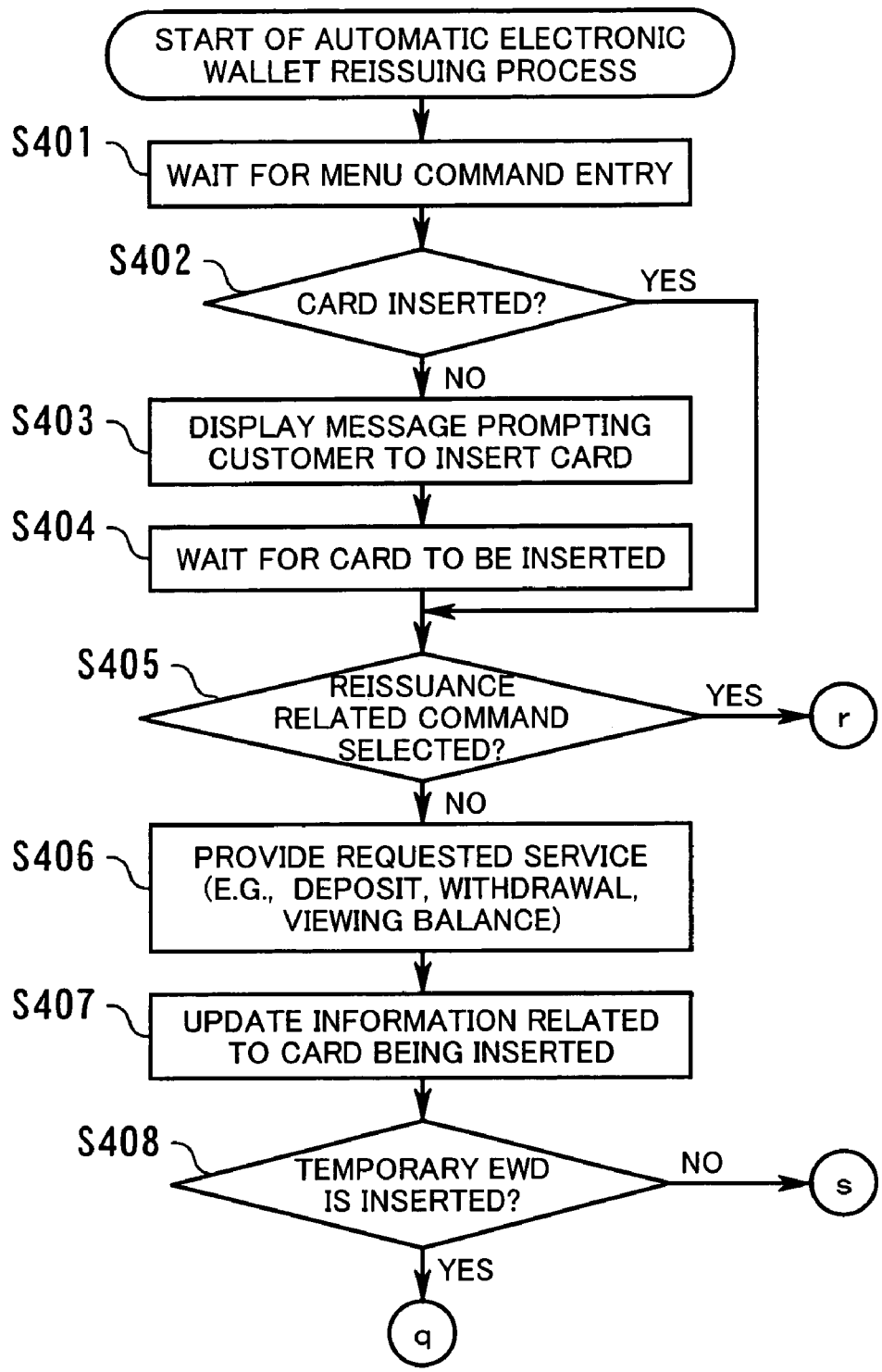
FIG. 24 is a diagram which shows the first half of an automatic issuance procedure of a reissued electronic wallet device.

FIG. 24 shows the first half of an automatic reissuance procedure of an electronic wallet device.

(S401) The ATM waits for the customer to select a command from a menu.

(S402) The ATM determines whether the customer has inserted his/her card. If there is a card, the process skips to step S405. If not, the process proceeds to step S403.

(S403) The ATM displays a message on the monitor screen to request the customer to insert his/her card.

(S404) The ATM waits for the customer to insert his/her card.

(S405) When a card is detected, the ATM determines whether the customer has selected a reissuance-related menu command (e.g., accident report or reception of a reissued wallet). If so, the current automatic reissuance process is terminated. If not, the process proceeds to step S406.

(S406) The ATM provides a service (e.g., deposit, withdrawal, viewing balance) as requested by the customer.

(S407) The ATM updates the account information related to the card being inserted. In a fund withdrawal, for example, the ATM subtracts that amount from the current deposit.

Figure 25:
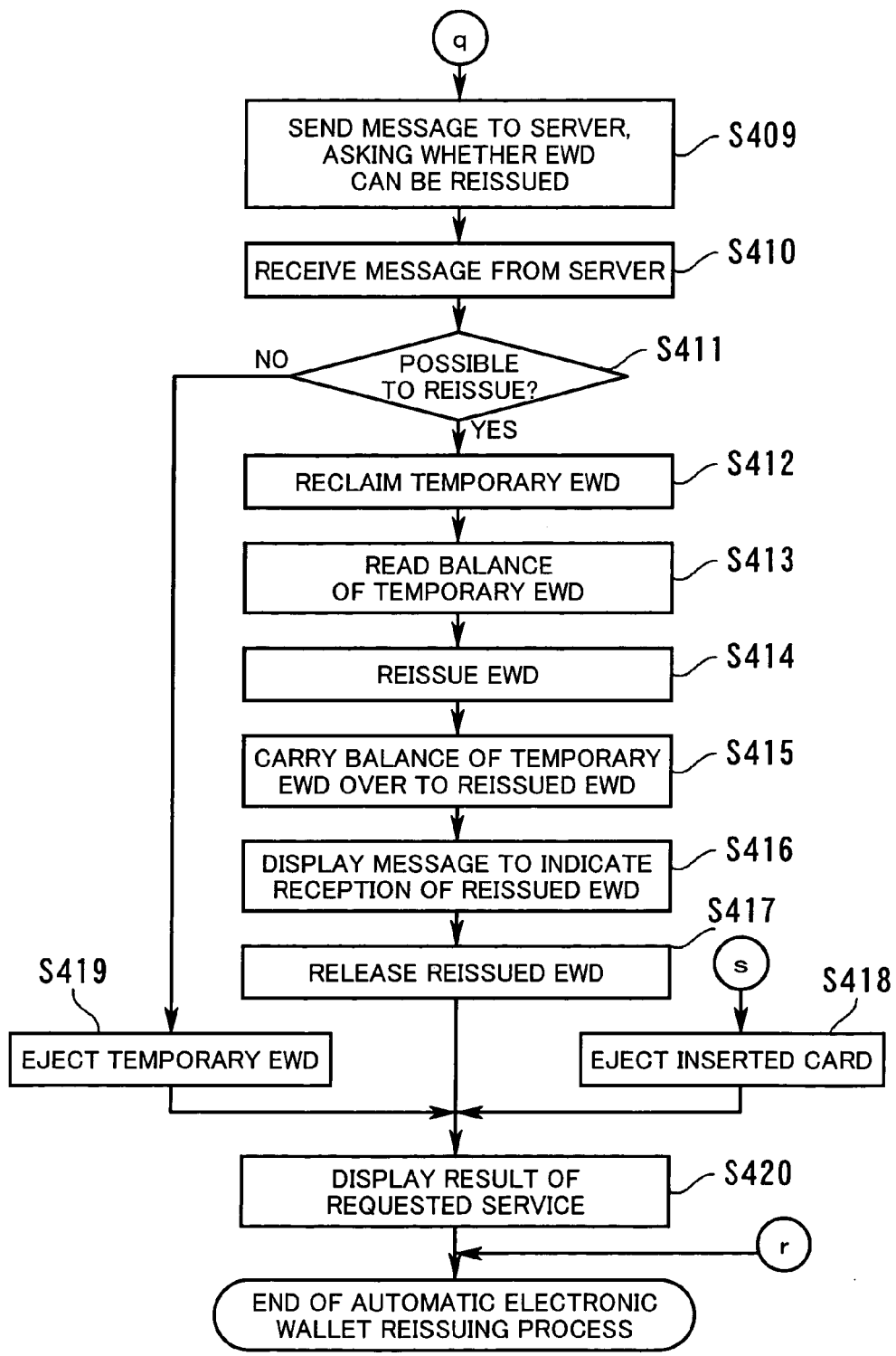
FIG. 25 shows the second half of the same procedure.

(S408) The ATM determines whether the inserted card is a temporary electronic wallet device. If so, the process advances to step S409 (FIG. 25). If not, the process proceeds to step S418 (FIG. 25).

FIG. 25 shows the second half of the same procedure.

(S409) The ATM sends a message to a server (e.g., electronic wallet management unit) to ask whether an electronic wallet device can be reissued.

In response to this confirmation message, the server determines whether it is ready to send data for reissuance. If it is ready, the server returns a positive response message to indicate its readiness. If not, the server returns a negative response.

(S410) The ATM receives a message from the server.

(S411) The ATM determines whether it is possible to reissue an electronic wallet device. If so, the process advances to step S412. If not, the process proceeds to step S419.

(S412) The ATM reclaims the temporary electronic wallet device.

(S413) The ATM reads the balance of the temporary electronic wallet device.

(S414) The ATM reissues an electronic wallet device.

(S415) The management unit carries the balance of the temporary electronic wallet device over to the reissued electronic wallet device.

(S416) The ATM displays a message indicating that it is releasing the reissued electronic wallet device.

(S417) The ATM releases the reissued electronic wallet device. The process advances to step S420.

(S418) The ATM ejects the card that has been inserted to it. The process advances to step S420.

(S419) The ATM outputs the temporary electronic wallet device. The process advances to step S420.

(S420) The ATM shows to the customer how his/her request was processed, and it exits from the current process.

The above processing steps makes direct reissuance of an electronic wallet device possible. That is, when the customer has inserted his/her temporary wallet and the electronic wallet data is ready for reissuance, the ATM uses it as an occasion to reissue the electronic wallet device to him/her. This mechanism eliminates the need for the customer to enter an explicit command to have his/her lost electronic wallet device reissued.

The above-described processing mechanisms of electronic wallet devices, electronic wallet device management units, and terminal stations, and financial institution processore are actually implemented as software functions of a computer system. In that case, the proposed processing steps are encoded in the form of computer programs, which will be stored in a computer-readable storage medium. The computer system executes those programs to provide the intended functions of the present invention. Suitable computer-readable storage media include magnetic storage media and semiconductor memory devices. Particularly, portable storage media, such as CD-ROMs and floppy disks, are suitable for circulation purposes. Further, it will be possible to distribute the programs through an appropriate server computer deployed on a network. Program files delivered to users are normally installed in their computers' hard drive or other local mass storage devices, which will be executed after being loaded to the main memory.

The above explanation of the present invention will now be summarized below. According to the present invention, the proposed electronic wallet management system is configured to save a predetermined set of wallet data to a backup database if a prescribed backup condition is met when the customer uses his/her electronic wallet device. Even if an electronic wallet device is lost or failed, the system preserves relatively recent records of that device. The use of such backup data reduces the time required for collecting information about the lost or failed electronic wallet device, thus permitting the system to reissue the device more promptly. This solves the inconvenience that the customer would experience if he/she could not use an electronic wallet for a long time.

Also, according to the present invention, the electronic wallet device is configured to provide a predetermined set of backup data if any backup condition is satisfied when it is used in transferring funds. By storing such backup data, an electronic wallet management unit can promptly reissue an alternative electronic wallet device when a customer lost his/her own device.

Further, according to the present invention, the electronic wallet management unit is configured to provide temporary electronic wallet data having a limited valid period and a credit limit that is determined according to the elapsed time since the last backup operation, when an accident report is received from a terminal station. A temporary electronic wallet device containing such temporary electronic wallet data can be issued to the customer for the sake of his/her convenience, with a minimum risk at the issuer side.

Moreover, according to the present invention, the proposed terminal station is configured to forward an accident report concerning an electronic wallet device to an electronic wallet management unit, receive temporary electronic wallet data from the unit, write that data to a memory of a temporary electronic wallet device, and release the device. That is, by entering an accident report to a terminal station, the customer can receive a temporary electronic wallet device which supports him/her for the time being.

Furthermore, according to the present invention, a computer-readable medium storing an electronic wallet management program is provided. This program is configured to cause a computer to save a predetermined set of backup data to a backup database, if a certain backup condition is met when an electronic wallet device is used. The stored electronic wallet management program can be executed on a computer system, which causes the computer system to function as the proposed automatic backup mechanism.

The foregoing is considered as illustrative only of the principles of the present invention. Furthre, since numerous modifications and changes will readily occur to those skilled in the art, it is not desired to limit the invention to the exact construction and applications shown and described, and accordingly, all suitable modifications and equivalents may be regarded as failing within the scope of the invention in the appended claims and their equivalents.

What is claimed is:

1. An electronic wallet management system which manages an electronic wallet devices holding monetary data, comprising:

backup condition testing means for testing predefined backup conditions to determine whether to make a backup, when the electronic wallet device communicates with any other device to transfer monetary data;

backup data sending means for sending out a predetermined set of backup data collected from the electronic wallet device, when said backup condition testing means has determined to make a backup;

backup data management means for receiving the backup data from said backup data sending means and saving the received backup data into a backup database;

receiving means for receiving an accident report concerning an electronic wallet device; and temporary electronic wallet issuing means, responsive to the accident report received by said receiving means, for calculating elapsed time between the last backup operation and the reception of the accident report, and issuing a temporary electronic wallet device with a limited valid period and a credit limit that is determined according to the elapsed time.

2. The electronic wallet management system according to claim 1, wherein:

the predefined backup conditions include a condition about the number of monetary data transfers; and said backup condition testing means determines to make a backup if the number of monetary data transfers has reached the number specified in the condition.

3. The electronic wallet management system according to claim 1, wherein:
the predetermined backup conditions include a condition about a time interval of backup operations; and
said backup condition testing means determines to make a backup if the elapsed time since the last backup operation exceeds the time interval.

4. The electronic wallet management system according to claim 1, wherein:
the predetermined backup conditions include a condition about an account to/from which the monetary data may be transferred; and
said backup condition testing means determines to make a backup if the monetary data is to be transferred to/from the account specified in the condition.

5. The electronic wallet management system according to claim 1, wherein:
the predetermined backup conditions include a condition about the amount of money to be transferred; and
said backup condition testing means determines to make a backup if the monetary data to be transferred exceeds the amount specified in the condition.

6. An electronic wallet management system which manages an electronic wallet devices holding monetary data, comprising:
receiving means for receiving an accident report concerning an electronic wallet device; and
temporary electronic wallet issuing means, responsive to the accident report received by said receiving means, for calculating elapsed time between the last backup operation and the reception of the accident report, and issuing a temporary electronic wallet device that can be used within a limited valid period and a credit limit determined according to the elapsed time.

7. The electronic wallet management system according to claim 6, further comprising reclaiming means for reclaiming the electronic wallet device when the accident report received by said receiving means describes the electronic wallet device was broken down.

8. An electronic wallet management unit which manages an electronic wallet device, comprising:
temporary electronic wallet data producing means, responsive to an accident report received from a terminal station, for calculating elapsed time between the last backup operation for an issued electronic wallet device and the reception of the accident report, compiling temporary electronic wallet data having a limited valid period and a credit limit that is determined according to the elapsed time, and sending the temporary electronic wallet data back to the terminal station.

9. A method for managing an electronic wallet device, comprising the steps of:
receiving an accident report concerning an electronic wallet device;
calculating, in response to the accident report received, elapsed time between a last backup operation and the reception of the accident report; and
issuing a temporary electronic wallet device that can be used within a limited valid period and a credit limit determined according to the elapsed time.

10. A computer-readable medium storing an electronic wallet management program which controls an electronic wallet management unit, the program causing a computer to perform the steps of:
calculating, in response to an accident report about an electronic wallet device, elapsed time between a last backup operation for the electronic wallet device and the reception of the accident report;
compiling temporary electronic wallet data having a limited valid period and a credit limit that is determined according to the elapsed time; and
sending the temporary electronic wallet data for use in issuance of a temporary electronic wallet device.

* * * * *